United States Patent
Goetz

(10) Patent No.: US 10,926,950 B2
(45) Date of Patent: Feb. 23, 2021

(54) TELESCOPIC DRIVE, STACKER CRANE COMPRISING SAME AND OPERATING METHOD AND USE THEREFOR

(71) Applicant: BAUMUELLER NUERNBERG GMBH, Nuremberg (DE)

(72) Inventor: Fritz Rainer Goetz, Kirchheim Unter Teck (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 110 days.

(21) Appl. No.: 16/080,032

(22) PCT Filed: Feb. 27, 2017

(86) PCT No.: PCT/DE2017/100155
§ 371 (c)(1),
(2) Date: Aug. 27, 2018

(87) PCT Pub. No.: WO2017/144055
PCT Pub. Date: Aug. 31, 2017

(65) Prior Publication Data
US 2019/0062135 A1    Feb. 28, 2019

(30) Foreign Application Priority Data

Feb. 26, 2016  (DE) ..................... 10 2016 203 134.1
Apr. 25, 2016  (DE) ..................... 10 2016 206 962.4
(Continued)

(51) Int. Cl.
*B65G 1/04*     (2006.01)
*B66F 9/14*     (2006.01)
(Continued)

(52) U.S. Cl.
CPC .......... *B65G 1/0478* (2013.01); *B66F 9/0655* (2013.01); *B66F 9/141* (2013.01);
(Continued)

(58) Field of Classification Search
CPC ........ B66F 9/141; B66F 9/0655; B66F 9/072; B66F 9/14; B66F 13/00; F16H 7/023;
(Continued)

(56) References Cited

U.S. PATENT DOCUMENTS 3,556,329 A  *  1/1971  Johnston ................. B66F 9/141
                                                              414/663
3,608,749 A     9/1971  Zollinger
(Continued)

FOREIGN PATENT DOCUMENTS

DE          19634216 A1    2/1998
DE       102013114275 A1    6/2014
(Continued)

*Primary Examiner* — Glenn F Myers
(74) *Attorney, Agent, or Firm* — Laurence A. Greenberg; Werner H. Sterner; Ralph E. Locher

(57) ABSTRACT

A telescopic drive contains a base having a securely attached toothed rack running in a first horizontal direction. At least one first carriage is arranged on the base, which is supported on the base such that it moves in the first horizontal direction by a linear guide, and which has a toothed belt drive formed by at least one electric motor and a revolving toothed belt. The toothed belt is driven by the electric motor, is tensioned in the first horizontal direction and is positioned on the toothed rack of the base. By integrating the telescopic drive into an electric-motor-driven cabin inside a three-dimensional shelving matrix of an equipment stand, both a compact construction and movements of a stored item are permitted, with the movements reaching up to or preferably also beyond the extension of an individual storage shelf.

18 Claims, 10 Drawing Sheets

(30) Foreign Application Priority Data

Apr. 27, 2016 (DE) .................... 10 2016 207 126.2
Sep. 22, 2016 (DE) .................... 10 2016 117 941.8

(51) Int. Cl.
| | | |
|---|---|---|
| B66F 9/07 | (2006.01) | |
| B66F 13/00 | (2006.01) | |
| F16H 55/26 | (2006.01) | |
| F16H 57/038 | (2012.01) | |
| B65G 1/137 | (2006.01) | |

(52) U.S. Cl.
CPC ............ *F16H 7/023* (2013.01); *B65G 1/0492* (2013.01); *B65G 1/1375* (2013.01); *B66F 9/072* (2013.01); *B66F 13/00* (2013.01); *F16H 55/26* (2013.01); *F16H 57/038* (2013.01)

(58) Field of Classification Search
CPC ........ F16H 7/038; F16H 55/26; F16H 57/038; B65G 1/04; B65G 1/0478; B65G 1/0492; B65G 1/1375; B60L 3/80; B60L 53/80; B60S 5/06
See application file for complete search history.

(56) References Cited

U.S. PATENT DOCUMENTS

| | | | | |
|---|---|---|---|---|
| 4,227,463 | A * | 10/1980 | Pfleger | B60K 1/04 |
| | | | | 104/172.2 |
| 4,388,033 | A * | 6/1983 | Pipes | B66F 9/141 |
| | | | | 212/350 |
| 5,375,958 | A | 12/1994 | Kluettermann | |
| 8,931,125 | B2 * | 1/2015 | Fang | F16H 37/124 |
| | | | | 108/137 |
| 2003/0126934 | A1 * | 7/2003 | Schinzel | B23Q 5/385 |
| | | | | 74/89.2 |
| 2005/0095095 | A1 | 5/2005 | Hansl | |
| 2009/0084749 | A1 * | 4/2009 | Massmann | B65G 47/901 |
| | | | | 212/312 |
| 2017/0100837 | A1 * | 4/2017 | Zevenbergen | B25J 5/00 |

FOREIGN PATENT DOCUMENTS

| | | |
|---|---|---|
| FR | 2072159 A1 | 9/1971 |
| JP | H0940119 A | 2/1997 |
| WO | 2017144054 A1 | 8/2017 |

* cited by examiner

TELESCOPIC DRIVE, STACKER CRANE COMPRISING SAME AND OPERATING METHOD AND USE THEREFOR

BACKGROUND OF THE INVENTION

Field of the Invention

The invention relates to a telescopic drive which is in particular a constituent part of a storage and retrieval unit. Preferably, the telescopic drive serves to pick up or set down a storage item in a high-bay warehouse. The invention also relates to a storage and retrieval unit, in particular for a high-bay warehouse, having such a telescopic drive. Finally, the present invention also relates to an operating method and to the use of such a storage and retrieval unit.

In order to temporarily store, make available and/or pick particular items, widespread use is made of high-bay warehouses, which have storage racks having end sides oriented in a first horizontal direction. Each storage rack comprises a number of storage compartments, which are arranged in a matrix and each provide a storage space, for example for a storage item set down on a Euro-pallet or for a container. The long sides of the individual storage racks are expediently directed toward one another and can delimit, between adjacent storage racks, a storage aisle oriented in a second horizontal direction. Via such storage aisles, it is possible to reach particular storage compartments, for example by means of a stacker truck and/or fork-lift truck. In order to reduce personnel costs, use is increasingly being made, instead of manually operated stacker or fork-lift trucks, of automated conveyor-vehicle lifting devices which are positioned within a storage aisle.

The conveyor-vehicle lifting devices known from the prior art usually have three degrees of freedom of movement, specifically a first, by moving the conveyor vehicle along the storage aisle, conventionally referred to as the x-axis, a second, by lifting and lowering a lifting device, referred to as the y-axis, and finally a third, consisting of a movement in a horizontal direction perpendicular to the two other directions, in particular by way of a telescopic drive, this usually being referred to as the z-axis and describing the movement during the loading and unloading of the storage compartments. This conventional nomenclature is also followed in the present text.

The documents DE 10 2013 114 275 A1 and US 2005/0095095 A1 disclose for example a conveyor-vehicle lifting device which has a vertical beam that extends over the entire height of the storage rack, said vertical beam being movable along the storage rack in the second horizontal direction. Attached to the vertical beam by means of a telescopic drive is a lifting table which is movable along the entire vertical direction of the vertical beam.

A telescopic drive known therefrom or for example from DE 196 34 216 A1 usually comprises an electric motor attached to the vertical beam, said electric motor driving rollers or a chain. These are operatively connected to the lifting table, such that the latter can be moved perpendicularly to the storage aisle and perpendicularly to the vertical direction, i.e. in the first horizontal direction. Consequently, it is possible to approach substantially every storage compartment of the storage rack by means of the lifting table and to remove a storage item from the storage rack or to deposit it there.

A drawback here is that the known conveyor-vehicle lifting device can only ever approach one storage compartment.

In order to avoid this, the applicant's corresponding PCT/DE2017/100154 of today's date proposes a storage and retrieval unit for a high-bay warehouse, having at least one cab that is guided in a three-dimensional compartment matrix of the storage and retrieval unit, said cab allowing the storage compartments to be approached and thus realizing an increased traveling speed, reference being made to said document in full in order to avoid repetitions.

SUMMARY OF THE INVENTION

Proceeding therefrom, the present invention is based on the object of specifying a telescopic drive that is improved compared with the prior art and a storage and retrieval unit, in particular for a high-bay warehouse, that is improved compared with the prior art, wherein preferably increased turnover of storage items is intended to be allowed and/or, if necessary, additional storage capacity is intended to be provided.

With regard to the telescopic drive, this object is achieved according to the invention by the features of the main telescopic drive claim, and, with regard to the storage and retrieval unit and an operating method therefor and also use thereof, this object is achieved according to the invention by the features of the further independent claims. Advantageous developments and configurations which are each implementable individually or in combination with one another are the subject matter of the respective dependent claims.

A telescopic drive according to the invention is first of all distinguished by a base, which comprises a firmly attached toothed rack, extending in a first horizontal direction, of the base.

The telescopic drive according to the invention is furthermore distinguished by at least one first carriage, which is arranged on the base and is supported on the base so as to be movable in the first horizontal direction by means of a linear guide.

Finally, the first carriage comprises according to the invention a toothed-belt drive made up of at least an electric motor and a circulating and at least externally toothed toothed belt that is driven by means of the electric motor, is tensioned in the first horizontal direction and is positioned on the toothed rack of the base.

By way of the telescopic drive according to the invention, in which a first carriage comprises a toothed-belt drive, the overall height of a telescopic drive can advantageously be embodied in a minimized manner such that the telescopic drive can be integrated into a storage and retrieval unit according to the invention.

In a first preferred configuration, on the first carriage, at least one table is arranged, which is supported on the first carriage so as to be movable in the first horizontal direction by means of a linear guide, and to which a toothed rack, extending in the first horizontal direction, of the table is firmly attached, said toothed rack being positioned on the toothed belt of the toothed-belt drive.

A displacement of the toothed belt by the electric motor of the toothed-belt drive advantageously displaces the first carriage with the toothed-belt drive with respect to the base by the amount of a travel movement in the first horizontal direction of at least half the length of the base. At the same time, the table is displaced by the same amount with respect to the first carriage. In this way, the table can advantageously be displaced overall with respect to the base by at least one length of the base, with the result that the telescopic drive in this configuration has an overall extension of at least two base lengths in the first horizontal direction.

In a second preferred configuration, also referred to as cascaded configuration in the following text, between the first carriage and a table, at least one second carriage is arranged, which is supported on the first carriage so as to be movable in the first horizontal direction by means of a linear guide; wherein the first carriage comprises, on its opposite side from the toothed-belt drive, a firmly attached toothed rack extending in the first horizontal direction; and wherein the second carriage comprises a toothed-belt drive made up of at least one circulating and at least externally toothed toothed belt which is tensioned in the first horizontal direction and is positioned on the toothed rack of the first carriage.

Given that the first carriage comprises, on its opposite side from the toothed-belt drive, a firmly attached toothed rack on which the toothed-belt drive of the second carriage is positioned, the overall height of a telescopic drive comprising at least two or more carriages can also be advantageously embodied in a minimized manner such that the telescopic drive can be integrated into a storage and retrieval unit according to the invention.

In a development of this cascaded configuration, it is preferred when, between the second carriage and the table, a third carriage is arranged, which is supported on the second carriage so as to be movable in the first horizontal direction by means of a linear guide; wherein the second carriage comprises, on its opposite side from the toothed-belt drive, an immovably attached toothed rack extending in the first horizontal direction; wherein the third carriage comprises a toothed-belt drive made up of at least one circulating and at least externally toothed toothed belt which is tensioned in the first horizontal direction and is positioned on the toothed rack of the second carriage; and wherein a toothed rack extending in the first horizontal direction is firmly attached to the third carriage, said toothed rack being positioned on the toothed belt of the toothed-belt drive of the second carriage.

This allows cascading of the telescopic drive, advantageously with small overall heights being maintained, in which, for each additional cascade of the respective toothed-belt drive, a toothed rack of the next carriage or table is moved and the toothed-belt drive of the respective carriage is moved by a toothed rack of the preceding carriage. Advantageously, overall only one toothed-belt drive has to be provided here.

Expediently, on the second or third carriage, a table may also be arranged, which is supported on the second or third carriage so as to be movable in the first horizontal direction by means of a linear guide, and to which a toothed rack, extending in the first horizontal direction, of the table is firmly attached, said toothed rack being positioned on the toothed belt of the toothed-belt drive of the second or third carriage.

Given that a toothed rack is also attached to the table, said toothed rack being positioned on the toothed belt of a second or third carriage, the table is displaced by an amount with respect to the base and thus advantageously contributes directly, i.e. without a further (third or fourth etc.) carriage needing to be provided, to the extension of the telescopic drive in the first horizontal direction.

Furthermore, in particular a configuration in which the toothed belt(s) are formed in a double-toothed manner has proven successful. The double toothing, preferred according to the invention, of the toothed belt(s) can allow better force transmission and also ensures, by avoiding slip, better position control of the toothed belt(s) with respect to the toothed racks arranged in each case thereunder or thereover.

In this way, the travel movement of the telescopic drive in the first horizontal direction can advantageously be completed in a positionally accurate manner.

Furthermore, the length of the travel movement in the first horizontal direction, i.e. the lift of the telescopic drive, can turn out to be much greater than when the carriage(s) and/or the table are directly connected to an exclusively internally toothed toothed belt.

Furthermore, it has proven successful when the toothed belt(s) are each tensioned by means of two rotatably mounted toothed-belt wheels, and the axes of rotation of the toothed-belt wheels extend in a second horizontal direction, in particular perpendicular to the first horizontal direction.

Such an arrangement advantageously allows the axis of rotation of the toothed-belt wheel, to be driven, of the toothed-belt drive to be coupled directly to the shaft of an electric motor without deflection means being interposed.

Accordingly, in a preferred configuration, the shaft of the electric motor is arranged in an aligned manner or, in an alternative configuration, at an angle of in particular 90° to the axis of rotation of an electromotively driven toothed-belt wheel, with angle-compensating deflection means such as in particular bevel gears being interposed.

The arrangement of the electric motor at an angle of in particular 90° to the axis of rotation of the toothed-belt wheel, to be driven, of the toothed-belt drive advantageously creates valuable installation space, in particular on the side remote from the motor, for the toothed-belt drives required in the preferably cascaded construction of a telescopic drive.

Furthermore, a configuration is preferred according to the invention in which optionally two telescopic drives are arranged parallel to one another to form a tandem, wherein at least the toothed-belt drive of one, preferably both, of the telescopic drives is attached to a, preferably common, shaft of an electric motor, in particular via one of the toothed-belt wheels.

The parallel arrangement of two telescopic drives, preferably driven via a common shaft, allows a telescopic drive to be configured as what is known as a telescopic fork, advantageously driven with only one electric motor. Storage items such as, in particular, containers, the skids of which do not have a continuous cutout in the bottom, but rather a cutout with an intermediate strut, in particular Euro-pallets, can thus be picked up and moved safely and without problems.

Furthermore, it has proven successful when the toothed racks extend along the entire length of the base in the first horizontal direction, the length of which corresponds to the length of the carriages and optionally of the table in the first horizontal direction.

This results in the overall length of the travel movement of a telescopic drive in the first horizontal direction, i.e. the overall lift of the telescopic drive by addition of the lengths of all possible travel movements in this first horizontal direction. It can advantageously be maximized in that all components, i.e. the toothed racks, the toothed belts, the carriages, optionally a table, and the base have the maximum possible length within the respective storage and retrieval unit.

Finally, in one configuration, it is preferred for the carriage(s) to be movable in the first horizontal direction by means of the toothed belt(s) on both sides of the base, i.e. both in a positive and in a negative first horizontal direction.

Movability on both sides, both in a positive and in a negative first horizontal direction, has the advantage that, by means of the telescopic drive, storage items can be put into and taken from storage compartments on both sides of a storage aisle. Furthermore, movability on both sides in a first horizontal direction advantageously allows direct transposition of storage items over the storage aisle without the storage item having to be set down in the meantime.

The present invention also relates to a storage and retrieval unit, in particular for a high-bay warehouse, having at least one cab that is electromotively driven at least in a second horizontal direction and a vertical direction and is guided in a three-dimensional compartment matrix of the storage and retrieval unit, said cab having a telescopic drive as claimed in one of the preceding claims for picking up a storage item.

The possibility of being able to move the telescopic drive at least also in a vertical direction within the cab by means of a storage and retrieval unit advantageously allows in particular lifting and lowering and thus, with the telescopic drive extended, the picking up and setting down of storage items from and into a storage compartment. The combination of travel movements of the cab in the vertical and in the second horizontal direction additionally allows, with the telescopic drive retracted, the transport of the storage item within a storage aisle to any desired storage compartment.

Such a storage and retrieval unit is particularly preferably suitable for a high-bay warehouse and is for example a constituent part of a high-bay warehouse. Therefore, the invention also relates to a high-bay warehouse having such a storage and retrieval unit. The high-bay warehouse comprises preferably a storage rack having a number of storage compartments, which are arranged in a matrix in three spatial dimensions, i.e. in a three-dimensional manner. Arranged longitudinally with respect to the storage rack is for example the storage and retrieval unit, which comprises preferably rack compartments that are likewise arranged so as to form a compartment matrix extending in three spatial directions, i.e. in a three-dimensional manner, a cab being movable within said compartment matrix, for example. The cab is electromotively driven in a vertical direction and in a second horizontal direction. The electromotively driven cab has a telescopic drive for receiving a storage item. The telescopic drive itself comprises a base and a first carriage arranged thereon, which is supported on the base so as to be movable in a first horizontal direction by means of a linear guide. Furthermore, the first carriage comprises a driven, circulating and at least externally toothed toothed belt, which is tensioned in a first horizontal direction and is positioned on a toothed rack that is immovably attached to the base and extends in the first horizontal direction.

The base itself is expediently attached to a bottom of the cab. Upon operation of the first carriage, the latter is moved preferably in the first horizontal direction so as to overlap the bottom of the cab, such that the carriage projects at least partially into a storage compartment of the storage rack of the high-bay warehouse. This makes it possible to introduce the storage item into the storage compartment or to remove it therefrom. The second horizontal direction, in which the cab is electromotively driven, is perpendicular to the first horizontal direction, in which the toothed belt is tensioned and in which the first carriage can be moved relative to the base. In particular, the storage rack is arranged next to the storage and retrieval unit in the second horizontal direction in the mounted state.

Preferably, the storage and retrieval unit is operated in accordance with a method in which, in order to pick up or set down a storage item on the telescopic drive, in particular on a table, if the latter is present, the cab is moved in the vertical direction. In this case, for picking up, in particular the first carriage, and the table, if the latter is present, are first of all moved away from the base in the first horizontal direction and consequently moved into a storage compartment. In this case, the storage item used is preferably a container with a container body supported on two skids, wherein the table or a second or further carriage, if the latter is present, or at least the first carriage, is moved to between the two skids beneath the body of the container. As a result of the cab being moved in a vertical direction, in particular upward, the telescopic drive is consequently brought into mechanical contact with the underside, located between the two skids, of the container body, and thus the container is lifted. Then, the toothed belt is driven and consequently the storage item is moved into a position located above the base in a vertical direction.

For setting down, the storage item located on the table above the base in the vertical direction is first of all moved into the storage compartment in the first horizontal direction by means of suitable driving of the toothed belt of a toothed-belt drive. As a result of the cab being moved in a vertical direction, in particular downward, the storage item is brought into contact with a bottom of the storage compartment. Upon further movement of the cab in the vertical direction, the mechanical contact between the telescopic drive and the storage item is undone. As soon as this has occurred, in particular the toothed belt of the toothed-belt drive is driven again and consequently the telescopic drive is retracted, for which purpose in particular the table, a second or further carriage (if present) or at least the first carriage is moved back into a position above the base in a vertical direction. Preferably, the first carriage and optionally further carriages and/or the table are movable in the first horizontal direction on both sides with respect to the base. This makes it possible to use a single storage and retrieval unit to serve two storage racks, which are positioned on both sides of the storage and retrieval unit in the second horizontal direction with respect to the storage and retrieval unit. In other words, the storage and retrieval unit is located in what is known as a storage aisle between two storage racks which can be served by the same storage and retrieval unit. Thus, only one storage and retrieval unit is required for at least two storage racks, thereby reducing production costs. If, in this case, the storage and retrieval unit comprises a number of cabs that each have a telescopic drive, this allows a large number of storage items to be put into and taken out of storage comparatively quickly in spite of only one storage and retrieval unit being used.

Preferably, according to the invention, the supply of the electric motor of the toothed-belt drive of the telescopic drive with electricity can be ensured by means of at least one rechargeable power storage device arranged in the cab, said rechargeable power storage device being charged in separate charging stations and/or preferably, with the cab at a standstill, from the power supply of the storage and retrieval unit via at least one plug connection, and/or, during the travel movements of the cab, by means of at least one dynamo set into rotation, preferably by means of at least one hub dynamo arranged in one of the rollers of the cab;

wherein the electric motor can be supplied with current for example via a power line that connects the motor to the power storage device and is preferably guided in a cable carrier.

The power supply of the electric motor of the telescopic drive for example via a power line, which is guided in particular with the aid of what is known as a cable carrier, with a rechargeable power storage device arranged in the cab represents in this case a comparatively simple and favorable solution in terms of construction, wherein the power storage device can be charged in separate charging stations and/or preferably, with the cab at a standstill, from the power supply of the storage and retrieval unit via at least one plug connection, and/or, during the travel movements of the cab, by means of at least one dynamo set into rotation, preferably by means of at least one hub dynamo arranged in one of the rollers of the cab; and wherein, in the first-mentioned case, the power storage device preferably has a larger power-storage-device capacity than in the configuration with hub dynamos, even if this is associated with a somewhat larger space requirement.

Furthermore, the present invention also relates to a method for operating a storage and retrieval unit, in which a travel movement of the cab in a vertical direction causes the storage item to be picked up or set down by means of a telescopic drive that engages sufficiently beneath the storage item.

Given that a travel movement of the telescopic drive, arranged in the cab, in a vertical direction takes place by means of the actual cab that is movable in the storage and retrieval unit, lifting and lowering and thus, with the telescopic drive extended, the picking up of the storage item from a storage compartment and setting it down therein is advantageously brought about without a separate vertical drive for the telescopic drive being necessary. Rather, this can be avoided by using the movement possibilities of the cab.

Finally, the present invention also claims the use of a storage and retrieval unit according to the invention, wherein the storage and retrieval unit comprises a multiplicity of cabs, which allow at least temporary storage of storage items in the storage and retrieval unit.

Specifically, the higher the number of cabs that are movable at the same time in a storage and retrieval unit, the higher the turnover of storage items can be in principle. Furthermore, the parallel use of several cabs also affords the advantage of it being possible to resort to alternative cabs at any time in the event of one cab having a fault and thus to realize parallel operation, it also being possible for said alternative cabs to serve, not just but at least temporarily, as an interim storage point.

In summary, the present invention provides a telescopic drive, a storage and retrieval unit comprising the latter, and an operating method and use therefor, having a base which comprises a firmly attached toothed rack extending in a first horizontal direction; and having at least one first carriage arranged on the base, said first carriage being supported on the base so as to be movable in the first horizontal direction by means of a linear guide; and which comprises a toothed-belt drive made up of at least an electric motor and a circulating toothed belt driven thereby, said toothed belt being tensioned in the first horizontal direction and being positioned on the toothed rack of the base.

The integration of the telescopic drive into a cab that is electromotively movable within a three-dimensional compartment matrix of an equipment rack allows not only a compact structure but also movements of a storage item, which go up to or preferably also beyond the extent of an individual storage compartment, and thus allows the storage item to be transferred to a different storage and retrieval unit in an adjacent parallel storage aisle.

In the preferably comprehensive configuration, it is thus possible for storage items to be transferred advantageously across a series of storage compartments and for the speed of distribution of storage items, i.e. the turnover thereof in a high-bay warehouse, advantageously to be increased. As a result of the number of cabs moved at the same time in a storage and retrieval unit being increased, the turnover of storage items per unit time and/or the storage capacity of the high-bay warehouse with the same space requirement can ultimately be at least temporarily increased, if necessary.

BRIEF DESCRIPTION OF THE SEVERAL VIEWS OF THE DRAWING

Further advantages and configurations are explained in more detail in the following text on the basis of preferred exemplary embodiments of the invention, and in conjunction with the drawing, in which, schematically:

FIG. 7b shows a plan view of the telescopic drive from FIG. 7a;

FIG. 8b shows a plan view of the extended telescopic drive from FIG. 8a;

FIG. 9b shows a plan view of the extended telescopic drive from FIG. 9a;

FIG. 10b shows a plan view of the telescopic drive from FIG. 10a;

DESCRIPTION OF THE INVENTION

In the following description of preferred embodiments of the present invention, identical reference signs denote identical or comparable components.

Figure 1A:
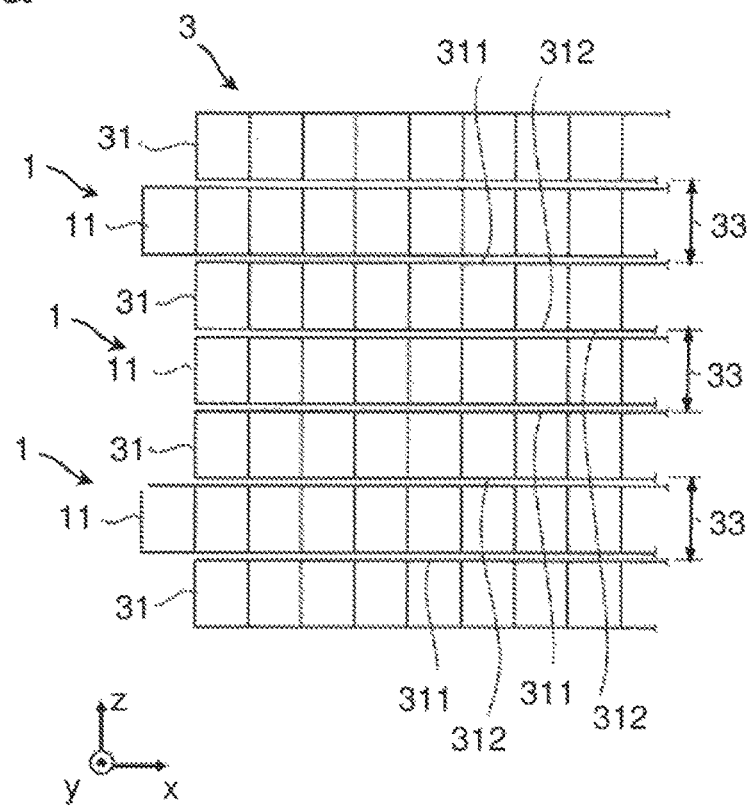
FIG. 1a shows a plan view of a first example of a high-bay warehouse having storage racks, and having storage and retrieval units that each have an equipment rack, wherein the high-bay warehouse always alternately has a storage rack and a storage aisle with a storage and retrieval unit arranged therein.

FIG. 1a shows a plan view of a detail of a first example of a high-bay warehouse 3 having storage racks 31, and having storage and retrieval units 1 that each have an equipment rack 11, wherein the high-bay warehouse 3 always alternately has a storage rack 31 and a storage aisle 33 with a storage and retrieval unit 1 arranged therein. By way of example, four storage racks 31 are illustrated, which are arranged in a row with their end faces 313 in a first horizontal direction Z and extend in a second horizontal direction X which is perpendicular to the first horizontal direction Z. Between each of the adjacent storage racks 31, a storage aisle 33 is formed in the second horizontal direction X, a storage and retrieval unit 1 being arranged in each of said storage aisles 33. Each of the storage racks 31 has a first side 311 and a second side 312, which each form the longitudinal boundary of the storage rack 31 in a second horizontal direction X. Each storage rack 31 can, in the example illustrated here, be loaded and unloaded directly by means of the storage and retrieval unit 1 both via the first side 311 and via the second side 321, which are each configured in an open manner in the first horizontal direction Z.

Figure 1B:
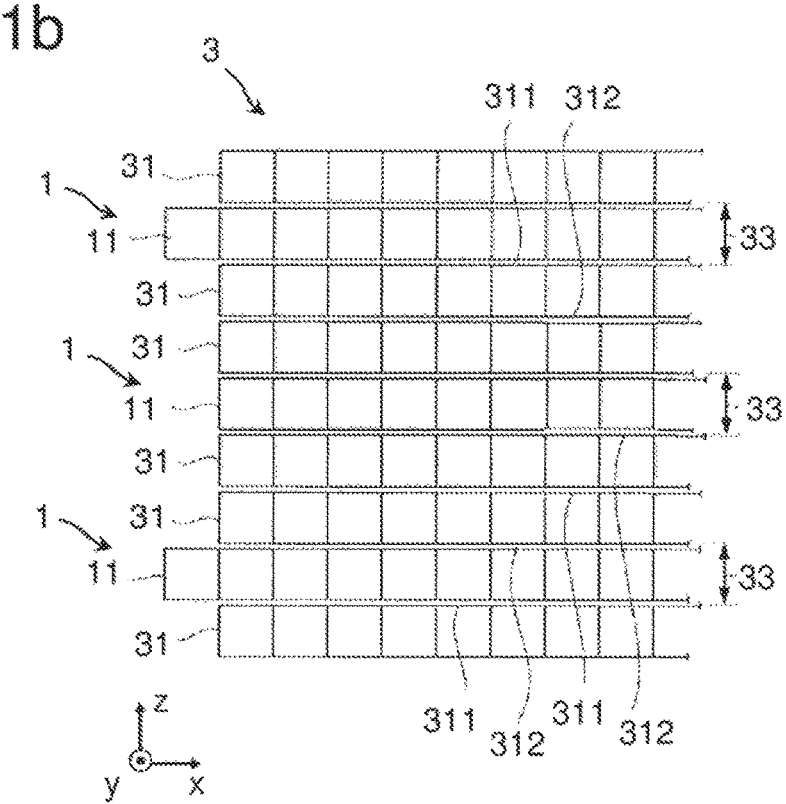
FIG. 1b shows a plan view of a second example of a high-bay warehouse having storage racks, and having storage and retrieval units that each have an equipment rack, wherein the high-bay warehouse always alternately has two mutually adjacent storage racks and a storage aisle with a storage and retrieval unit arranged therein.

FIG. 1b shows a plan view of a second example of a high-bay warehouse 3 having storage racks 31, and having storage and retrieval units 1 that each have an equipment rack 11, wherein the high-bay warehouse 3 always alternately has two mutually adjacent storage racks 31 and a storage aisle 33 with a storage and retrieval unit 1 arranged therein. In this configuration, direct loading and unloading of the storage racks 31 is only possible via in each case one of the sides 311 or 312, namely via that side which faces a storage aisle 33—but the storage capacity of such a high-bay warehouse 3 is considerably increased compared with the one in FIG. 1.

In a specific configuration of a telescopic drive 2 that is preferred according to the invention and integrated into the storage and retrieval unit 1, it is additionally advantageously possible to transfer the storage items 4 across two adjacent storage racks 31, this then allowing an identical loading/unloading functionality with a much lower number of required storage and retrieval units 1.

Figure 2A:
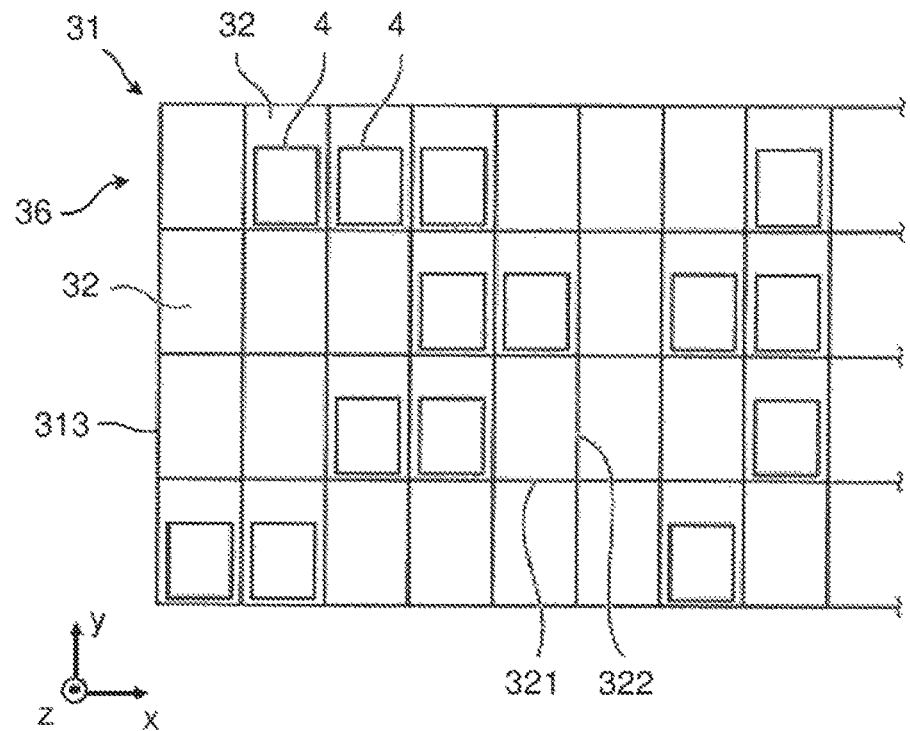
FIG. 2a shows a side view of one of the storage racks with storage items received therein.
Figure 2B:
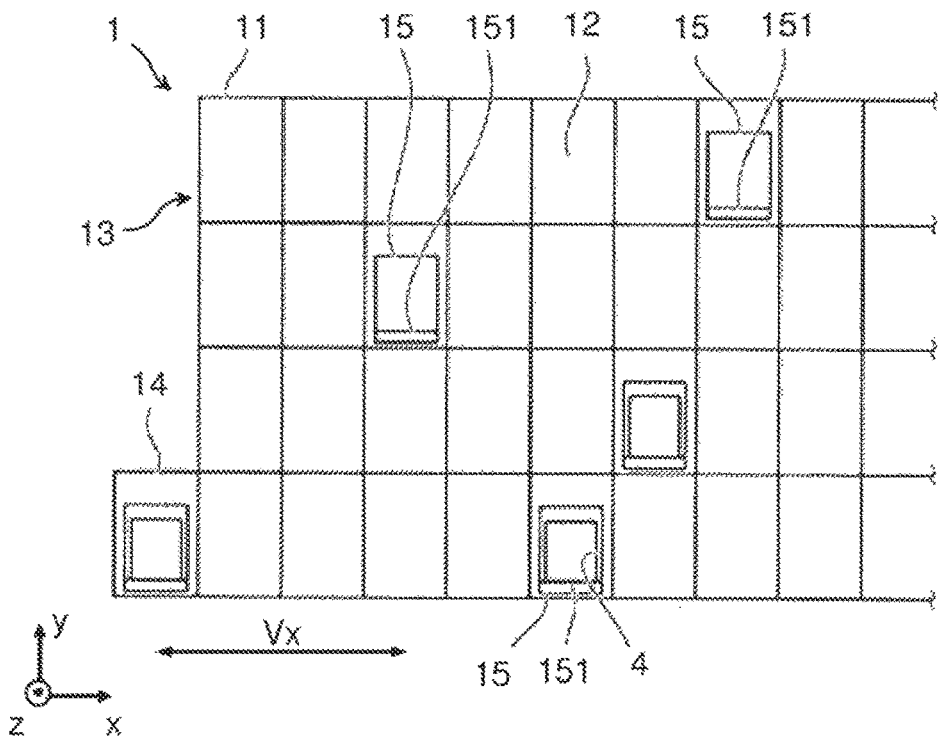
FIG. 2b shows a side view of one of the equipment racks and cabs guided therein.

FIG. 2a and FIG. 2b respectively show a side view of one of the storage racks 31 with storage items 4 received therein (FIG. 2a) and of one of the equipment racks 11 and cabs 15 guided therein (FIG. 2b). The storage rack 31 has storage compartments 32 arranged so as to form a three-dimensional compartment matrix 36, said storage compartments 32 being arranged alongside one another in a second horizontal direction X, and in a vertical direction Y, so as to form a three-dimensional compartment matrix 36 of the storage rack 31. The storage compartments 32 are preferably configured in an identical manner and formed for example by means of struts 322 that extend in the first Z and second X horizontal direction and in the vertical direction Y. Within some of the storage compartments 32, storage items 28 (FIG. 2a) are positioned or positionable, for example via the equipment rack 11 of a storage and retrieval unit 1. Such an equipment rack 11, illustrated in FIG. 2b, accordingly has a number of rack compartments 12 which, in each case configured preferably in a cuboidal and identical manner and arranged alongside one another in the second horizontal direction X and the vertical direction Y, form a compartment matrix 13, extending in three spatial directions, i.e. in a three-dimensional manner, of the storage and retrieval unit 1.

Furthermore, it is possible to attach to the three-dimensional compartment matrix 13 of the equipment rack 11 a loading compartment 14 (cf. also FIGS. 3a and 3b), which is preferably constructed in an identical manner to the rack compartments 12, and via which storage items 4 can be fed to and/or discharged from the storage and retrieval unit 1. If required, a cab 15 is positioned or positionable within the rack compartments 12 or the loading compartment 14, said cab 15 containing a storage item 4 if necessary. The cab 15 itself is in particular electromotively driven, wherein for example each cab 15 has two toothed racks, one of which extends in the second horizontal direction X and the other of which extends in the vertical direction Y. Preferably, a plurality of electromotively movable cabs 15 having a cab bottom 151 are arranged in the equipment rack 11, said cabs 15 being movable in the second horizontal direction X and in the vertical direction Y.

To this end, each of the rack compartments 12 has preferably two electromotively driven toothed belts (not illustrated), of which one extends likewise in the second horizontal direction X and the other in the vertical direction Y. If one of the toothed racks of the cab 15 is engaged with the respective toothed belt, and the latter is driven, the cab 15 is consequently moved in the respective direction X or Y as far as the next rack compartment 12 and the toothed belt thereof. Thus, each cab 15 is movable in an electromotively driven manner from each rack compartment 12 in the second horizontal direction X and in the vertical direction Y within the three-dimensional compartment matrix 13. Expediently, the storage and retrieval unit 1 has a number of identical cabs 15, which can be moved independently of one another.

Figure 3A:
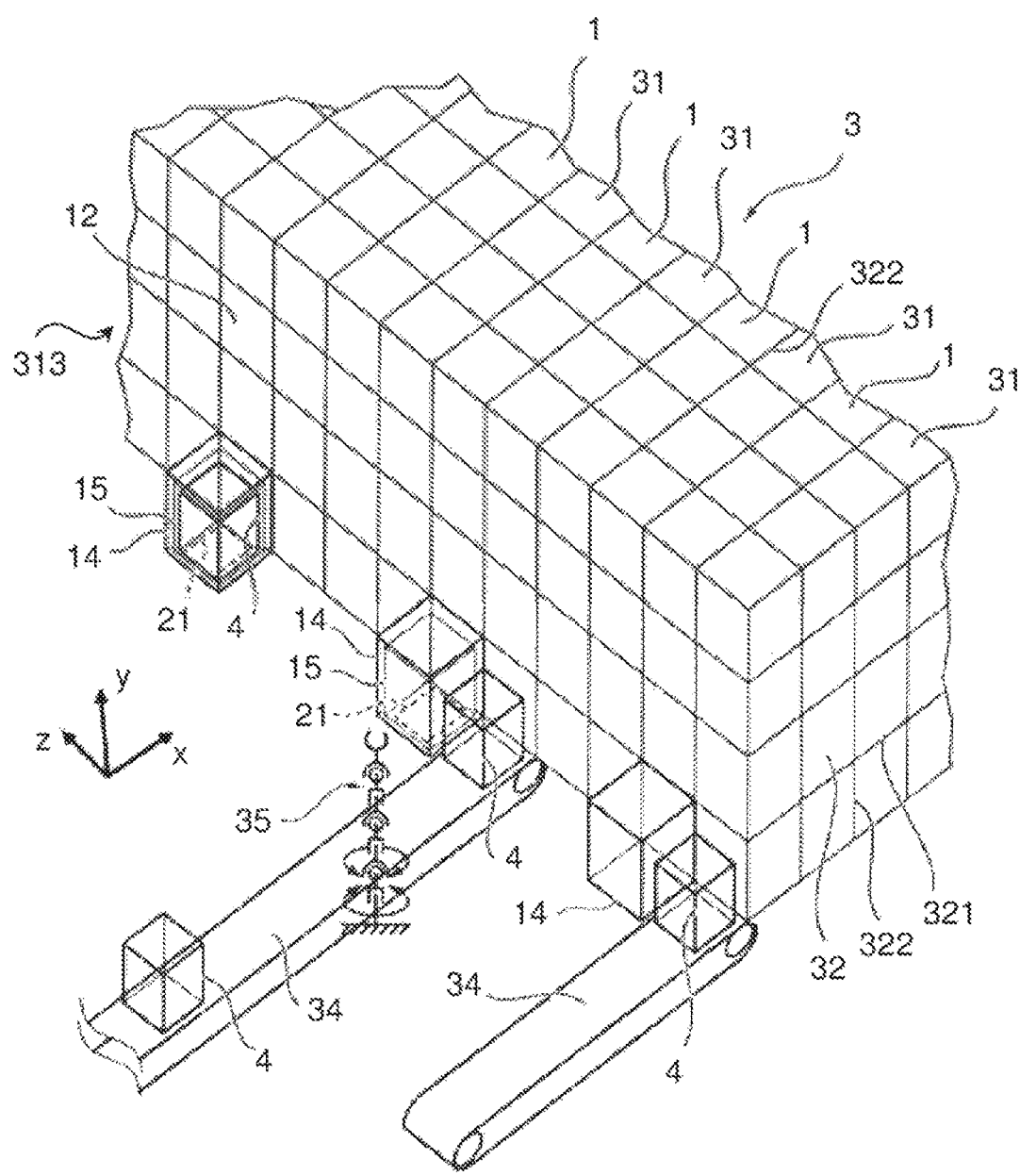
FIG. 3a shows a simplified perspective detail of storage racks and storage and retrieval units of a high-bay warehouse analogous to FIG. 1.
Figure 3B:
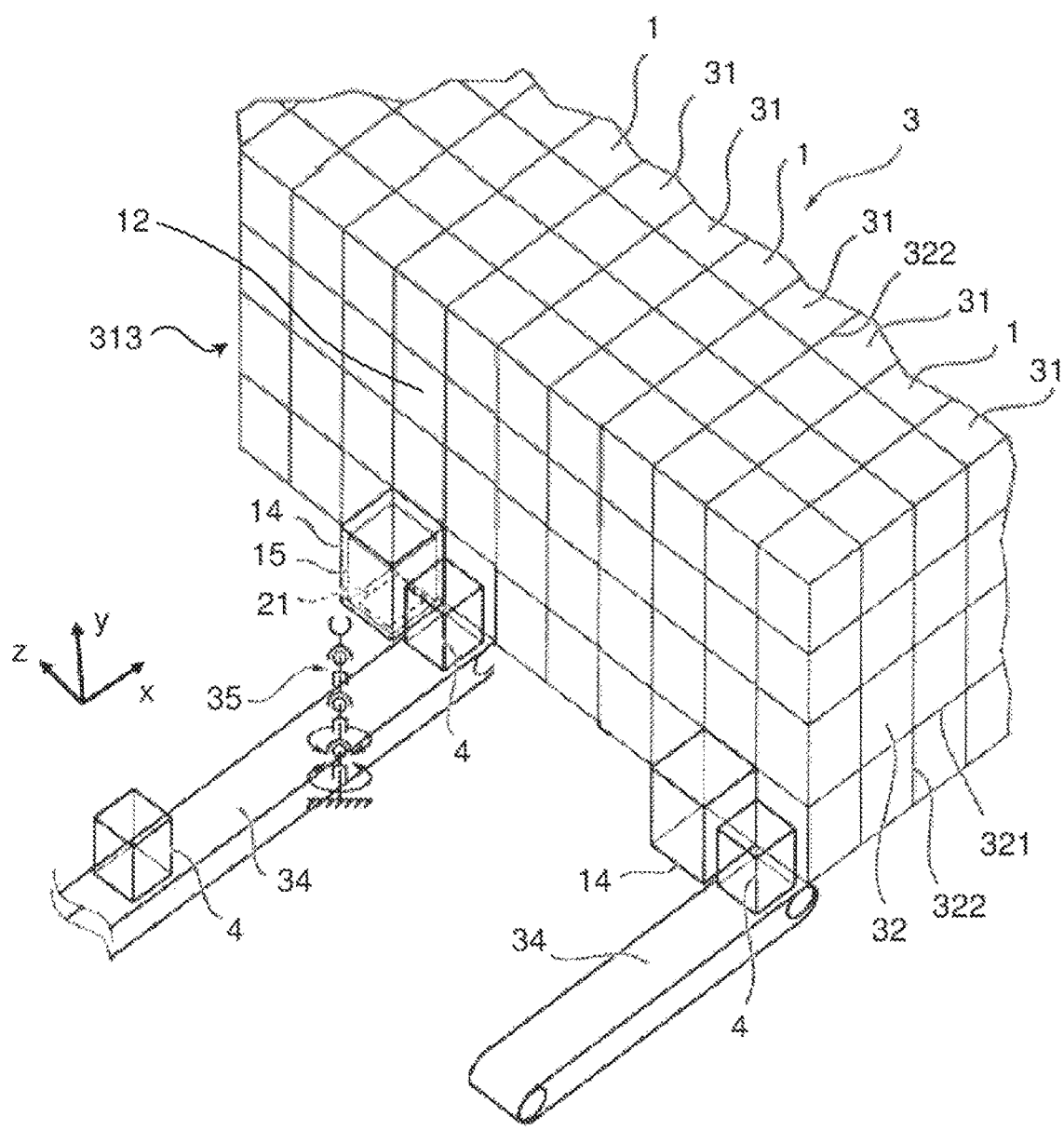
FIG. 3b shows a simplified perspective detail of storage racks and storage and retrieval units of a high-bay warehouse analogous to FIG. 2.

FIG. 3a and FIG. 3b each show a simplified perspective detail of storage racks 31 and storage and retrieval units 1 of a high-bay warehouse 3 analogous to FIGS. 1a and 1b, respectively, wherein, in the first variant (FIG. 3a), the high-bay warehouse 3 always alternately has a storage rack 31 and a storage and retrieval unit 1 arranged in a storage aisle 33, and, in the second variant (FIG. 3b), the high-bay warehouse 3 always alternately has two mutually adjacent storage racks 31 and a storage and retrieval unit 1 arranged in a storage aisle 33.

The storage racks 31 have the individual storage compartments 32, the edges of which are formed by means of the struts 322, which are arranged at right angles to one another. Arranged adjacently to at least one side 311 or 312 of each storage rack 31 is a storage and retrieval unit 1. The storage and retrieval unit 1 is formed by the equipment rack 11, which comprises the rack compartments 12. The rack compartments 12 are each configured in a cuboidal and identical manner. In addition, the rack compartments 12 are arranged so as to form a three-dimensional compartment matrix 13, which comprises a plurality of rows (planes) and a plurality of columns in the examples shown. In the mounted state, the equipment rack 11 is positioned on at least one side 311 and/or 312 of each storage rack 31 and fastened thereto. The number and arrangement of the rack compartments 11 correspond to the number and arrangement of the storage compartments 32. In other words, the storage rack 31 likewise has a plurality of columns and a plurality of rows and planes. In addition, the size of the storage compartments 32 in the second horizontal direction X and the vertical direction Y corresponds substantially to that of the rack compartments 12, such that each of the storage compartments 32 of the storage rack 31 is assigned one of the rack compartments 12, which substantially adjoins the respective storage compartment 32 in the first horizontal direction Z and is for example aligned therewith.

Each of the cabs 15 comprises a merely schematically illustrated telescopic drive 2, which is located on the cab bottom 151 of the respective cab 15. By means of the telescopic drive 2, storage items 4 located in the respective cab 15 can be introduced into the associated storage compartment 32 or can be removed therefrom into the cab 15.

The telescopic drive 2 thus serves in particular to shift a storage item 4 or comparable article, wherein at least one constituent part of the telescopic drive 2 in this case remains firmly on a base 21, for example the base of a cab 15. Suitably, the telescopic drive 2 is a constituent part of a storage and retrieval unit 1 and serves preferably to shift storage items 4 designed typically for a high-bay warehouse 3 (see FIG. 4). In this case, the storage items 4 are moved into a storage compartment 32 of a storage rack 31 of a high-bay warehouse 3 for example by means of the telescopic drive 2. Preferably, a constituent part of the storage and retrieval unit 1 remains in a fixed position, wherein the telescopic drive 2 is suitably not attached to this part of the storage and retrieval unit 1 but preferably to the base 21 of a cab 15 guided therein. In this way, the telescopic drive 2 suitably serves to pick up and set down a storage item 4.

Also illustrated is the manner in which a loading compartment 14 can be arranged on at least one storage and retrieval unit 1 on one end side 313 of the high-bay warehouse 3, said loading compartment 14 allowing storage items 4 to be fed into and discharged from the storage and retrieval unit 1. To this end, the high-bay warehouse 3 comprises for example conveyor belts 34 which can extend in the second horizontal direction X and which are each assigned to one of the loading compartments 14. In this case, each of the conveyor belts 34 is arranged so as to be directly adjacent, in the first horizontal direction X, to in each case one of the loading compartments 14. Each of the loading compartments 14 serves to load and unload a cab 15 of the respective storage and retrieval unit 1. In this case, provided that the cab 15 is located within the loading compartment 14, the storage items 4 are conveyed by the conveyor belt 34 into the cab 15 or are conveyed from the latter onto the respective conveyor belt 34. The loading and unloading of the conveyor belt 34 takes place preferably in an automated manner, for example by means of a robot 35, which can be in particular a six-axis jointed arm robot having a gripper hand, as illustrated here.

Figure 4:
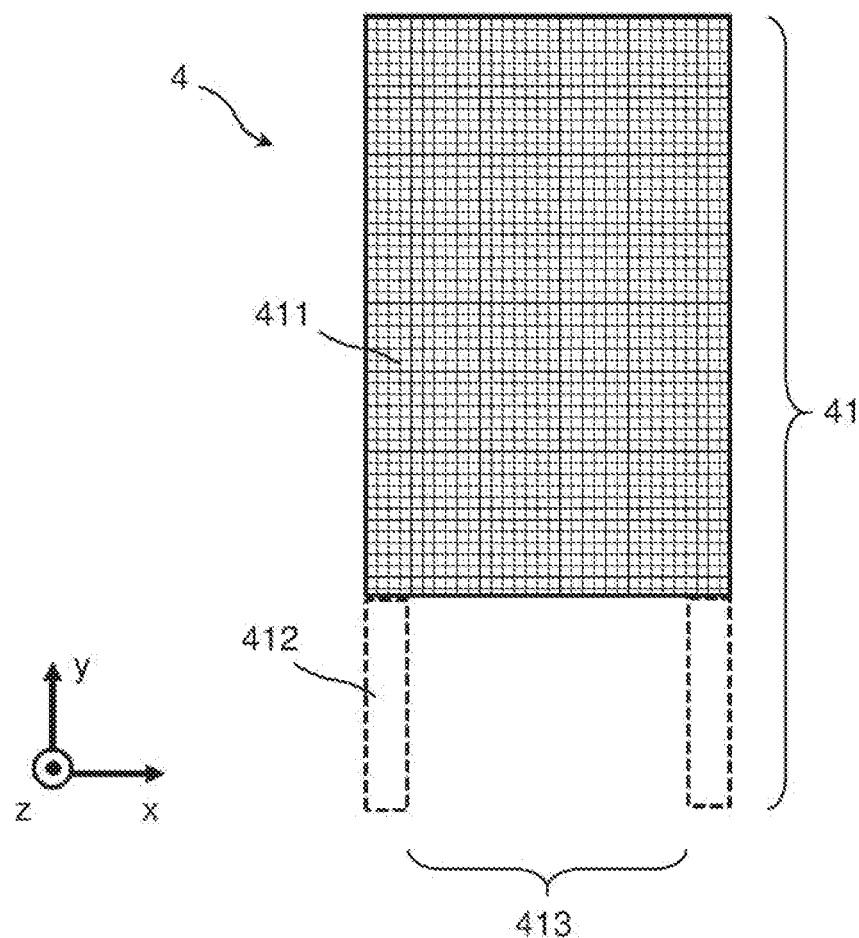
FIG. 4 shows a front view of a typical storage item for storage in a high-bay warehouse.

FIG. 4 shows by way of example a front view of a typical storage item 4 for storing in a high-bay warehouse 3, in particular a container 41, which comprises a container body 411 and container skids 412, which are arranged in a manner separated from one another by at least one recess 413. FIG. 4 shows by way of example a front view of a typical storage item 4 which can be arranged within a storage compartment 32 of a high-bay warehouse 3. The storage item 4 can be in particular a container 41 having a container body 411, on the underside of which two skids 412 that extend in the first horizontal direction Z are attached, said skids 412 resting in the high-bay warehouse 3 on a storage-compartment bottom 321 of one of the storage compartments 32. Between the two container skids 412, the container body 411 and the storage-compartment bottom 321 there thus remains a recess 413 for the telescopic drive 2 to engage in.

Alternatively or in addition, the storage items 4 can also be in the form of loaded pallets, in particular Euro-pallets (not illustrated), which, as is known, likewise have suitable recesses for in particular what is known as a tandem telescopic drive (not illustrated) to engage in.

Such a tandem telescopic drive is formed preferably from two telescopic drives 2 that are arranged parallel to one another to form a tandem. In this case, at least the toothed-belt drive 23 of one, preferably of both, of the telescopic drives 2 can be attached directly or indirectly to a, preferably common, shaft 235 of an electric motor 234, in particular via one of the toothed-belt wheels 232.

Furthermore, the high-bay warehouse 3 can, in addition to the storage and retrieval unit 1, be adapted freely to any conceivable commercially customary or custom requirements.

Figure 5:
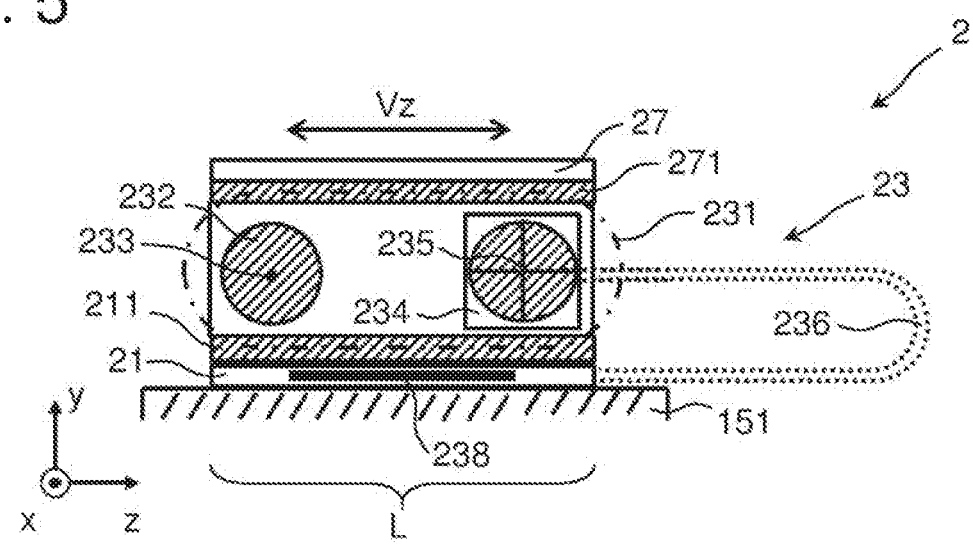
FIG. 5 shows a side view of a first exemplary embodiment of a telescopic drive of one of the cabs.

FIG. 5 shows a side view of a first exemplary embodiment of a telescopic drive 2 of one of the cabs 15.

The illustrated telescopic drive 2 has a base 21, which can be arranged on a cab bottom 151 of a cab 15 and which comprises a firmly attached toothed rack 211, extending in the first horizontal direction Z, of the base 21.

The telescopic drive 2 thus has a base 21, which is preferably suitable, in particular intended and set up, for being firmly mounted. In other words, the base 21 comprises mounting means or is intended to receive mounting means, by means of which the telescopic drive 2 can be fastened to further components, in particular of a storage and retrieval unit 1. For example, the base is attached to a vertical beam of a commercially customary or of a cab 15 of a storage and retrieval unit 1 according to the invention, provided that the telescopic drive 2 is a constituent part of a storage and retrieval unit 1. The telescopic drive 2 is preferably intended and set up to shift a component in a first horizontal direction Z with respect to the base 21. Firmly attached to the base 21 is a first toothed rack 211, which extends in the first horizontal direction Z. Thus, the first toothed rack 211 is always kept in a fixed position with respect to the base 21 and not movable with respect to the latter. For example, the first toothed rack 211 can be fastened to the base 21 by means of screws.

Figure 6:
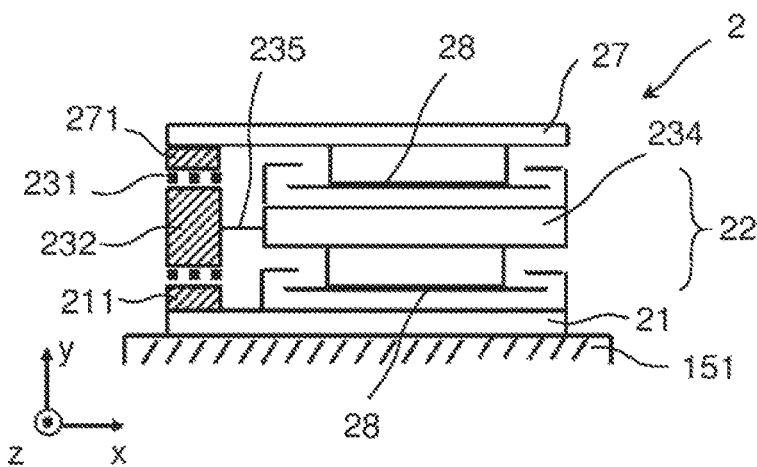
FIG. 6 shows the telescopic drive from FIG. 5 in a sectional illustration rotated through 90°.

Arranged on the base 21 is a first carriage 22, which is supported on the base 21 so as to be movable, with respect to a travel direction $V_z$, in the first horizontal direction Z by means of a linear guide 28 (illustrated in detail in FIG. 6).

In other words, the base 21 is located beneath the first carriage 22 in the vertical direction Y. The first carriage 22 itself is movable in the first horizontal direction Z with respect to the base 21. Thus, it is possible to move the first carriage 22 in the first horizontal direction Z with respect to the base 21. In order to allow this movement, the telescopic drive 2 has a linear guide 28, by means of which the first carriage 22 is guided with respect to the base 21 and is consequently supported thereon.

The linear guide 28 has for example rollers, which are guided along a rail. In this case, for example, the rail is a constituent part of the base 21 and the rollers are a constituent part of the first carriage 22. Alternatively, the base 21 can have the rollers and the carriage 22 the rails.

Preferably, the linear guide 28 comprises a groove extending in the first horizontal direction Z, a sliding shoe that likewise extends in the first horizontal direction Z being at least partially arranged in said groove. A clearance fit is preferably established between the sliding shoe and the groove. In this case, either the base 21 has the groove and the carriage 22 has the sliding shoe, or vice versa. Thus, in this configuration, the first carriage 21 is guided in the first horizontal direction Z by means of the sliding shoe being slid within the groove of the linear guide 28. In a further alternative, the linear guide 28 can be configured as a separate component and not be a constituent part of the first carriage 22 or of the base 21.

According to the invention, the first carriage 22 comprises a toothed-belt drive 23 made up of at least one electric motor 234 and a circulating toothed belt 231 that is at least externally toothed or preferably configured in a double-toothed manner and is driven by means of the electric motor 234, said toothed belt 231 being tensioned in the first horizontal direction Z and being positioned on the first toothed rack 211 of the base 21.

In other words, a closed curve is established by means of the toothed belt 231. The toothed belt 231 is stretched in the first horizontal direction Z, for which purpose preferably two flanks, which, in particular, each extend in the first horizontal direction Z, have preferably along a third of the length of the toothed belt 231. The toothed belt 231 is positioned on the toothed rack 211 of the base 21 and consequently meshes therewith. Suitably, one of the flanks, extending in the first horizontal direction Z, of the toothed belt 231 engages with the toothed rack 211 of the base 21 at least sectionally in the first horizontal direction Z. The toothed belt 231 itself is suitably not attached to this toothed rack 211, i.e. not fastened thereto. Rather, there is merely a form fit on account of the toothing. Further fastening means are preferably not provided. Given that the toothed belt is merely positioned on the toothed rack 211 of the base 21, advantageously both comparatively easy mounting and also removal of the telescopic drive 1 is allowed. Preferably, the teeth of the toothed rack 211 of the base 21 are directed upward in the vertical direction Y and consequently toward the toothed belt 231. Suitably, the tooth pitch of the toothed belt 231 is adapted to the tooth pitch of the toothed rack 211 attached to the base 21.

Particularly preferably, the toothed belt 231 is configured in a double-toothed manner, i.e. in an internally and externally toothed manner, wherein the tooth pitches of the internal and external teeth can for example also be different. In this way, driving of the toothed belt 231 is simplified, which takes place for example by means of a toothed-belt wheel (gear wheel) 252 around which the toothed belt 231 is at least partially wrapped, and on which the toothed belt 231 is consequently placed. In this way, engagement between the toothed belt 231 and the respective toothed rack 211 or 271 is not impeded on account of the components required for driving the toothed belt 231. Preferably, the toothed belt 231 is tensioned by means of two rotatably mounted toothed-belt wheels 232, which are preferably offset with respect to one another only in the first horizontal direction Z. In this case, the spacing of the two toothed-belt wheels 232 with respect to one another is preferably greater than or at least equal to 50%, 60%, 70%, 80% or 90% of the length L of the first carriage 22 in the first horizontal direction Z. In this way, even if the first carriage 22 is moved a comparatively long way in the first horizontal direction Z, the toothed belt 251 is engaged with the respective toothed rack 211 or 271.

As a result of the telescopic drive 2 according to the invention, in which a first carriage 22 comprises a toothed-belt drive 23, the overall height of a telescopic drive 2 can be embodied advantageously in a minimized manner such that the telescopic drive 2 can be integrated into a storage and retrieval unit 1 according to the invention. In this case, on the first carriage 22, at least one table 27 can be arranged, which is supported on the first carriage 22 so as to be movable in the first horizontal direction Z by means of a linear guide 28 (illustrated in detail in FIG. 6), and to which a toothed rack 271, extending in the first horizontal direction Z, of the table 27 is firmly attached, said toothed rack 271 being positioned on the toothed belt 231 of the toothed-belt drive 23.

In other words, the first carriage 22 is positioned between the table 27 and the base 21. Given that the table 27 itself is supported on the first carriage 22 by means of a linear guide 28, it is guided in the first horizontal direction Z. Consequently, the table 27, too, is movable in the first horizontal direction Z with respect to the first carriage 22. Particularly preferably, the linear guide 28 between the table 27 and first carriage 22 is configured so as to be substantially identical in terms of construction to the linear guide 28 between the first carriage 22 and base 21, this advantageously allowing the use of identical parts. Furthermore, a toothed rack 271 is firmly attached to the table 27, said toothed rack 271 extending in the first horizontal direction Z and not being movable with respect to the table 27, but being fastened thereto in a suitable manner, in particular by means of screws.

In turn, the toothed rack 271 of the table 27 is for its part positioned on the externally toothed toothed belt 231 and consequently engaged therewith. Thus, the toothed belt 231 is meshed with the toothed racks 211 and 271 of the base 21 and table 27, wherein the toothed belt 231 is preferably not fastened to the one 211 or to the other toothed rack 271. Rather, the engagement between the toothed belt 231 and toothed racks 211 and 271 is established in each case by positioning, this allowing comparatively easy mounting and removal. Suitably, the tooth pitch of the toothed rack 271 arranged on the table 27 is also adapted to the tooth pitch of the toothed belt 231.

Expediently, the toothed belt 231 is also arranged between the toothed racks 211 and 271 of the base 21 and table 27. In this case, preferably two different flanks, extending in the first horizontal direction Z, of the toothed belt 231 are engaged with the two toothed racks 211 and 271. In this case, the toothed rack 271 arranged on the table 27 is preferably engaged with the flank of the toothed belt 231 tensioned in the first horizontal direction Z, said flank being parallel to that flank of the toothed belt 231 that is engaged with the toothed rack 211 arranged on the base 21. Preferably, the teeth of the toothed rack 211 of the base 21 are directed upward in the vertical direction Y and the teeth of the toothed rack 271 of the table 27 are directed downward in the vertical direction Y, and consequently in each case toward the toothed belt 231. When the toothed belt 231 is driven, the two flanks are then moved in opposite directions to one another in the first horizontal direction Z. In this way, a comparatively cost-effective and robust telescopic drive 2 is provided, in which the toothed belt 231 rolls on the toothed racks 211 and 271 of the base 21 and table 27, wherein the first carriage 22 is moved with respect to the base 21 in the same direction as the table 27 is moved with respect to the first carriage 21. Thus, the extension of the telescopic drive 2 in the first horizontal direction Z is increased on account of the table 27, with the result that the extension and travel speed is advantageously more or less doubled.

Preferably, the toothed rack 271 arranged on the table 27 also extends along the entire length of the table 27 in the first horizontal direction Z. In particular, the toothed rack 271 is extended so as to be flush with the table 27 at its free end, thereby avoiding damage to this toothed rack 271. In this way, too, a comparatively compact telescopic drive 2 is provided. On account of the comparatively great extension of the toothed rack 271 arranged on the table 27, the table 27 can be moved comparatively far with respect to the first carriage 22, wherein a comparatively large number of teeth of the toothed belt 231 and of the toothed rack 271 arranged on the table 27 always remain engaged.

Preferably, the table 27 arranged on the first carriage 21 is configured so as to be suitable for receiving articles, for example storage items 4. Consequently, it is also possible for specific storage items 4, such as custom containers 41, to be picked up and set down by means of the table 27. In this case, the table 27 is produced preferably from a resistant material, such as steel, thereby avoiding damage to the telescopic drive 2.

FIG. 6 shows the telescopic drive 2 from FIG. 5 in a sectional illustration rotated through 90°. The manner in which the linear guides 28 advantageously support the first carriage 22 and the table 27 directly or indirectly on the base 21 so as to be movable with respect to the travel movement $V_z$ in the first horizontal direction Z is illustrated.

In other words, the first carriage 22 is movable in the first horizontal direction Z with respect to the base 21 and the table 27 is movable likewise in the first horizontal direction Z with respect to the first carriage 22 and thus with respect to the base 21. The linear guides 28 are of identical construction as far as possible and formed for example by means of a sliding shoe which is inserted in a C-shaped groove. Consequently, a travel movement $V_z$ in the first horizontal direction Z can be carried out. Preferably, a table 27 is fastened to the top side of the first carriage 22, said table 27 having a comparatively stable surface with a comparatively high friction coefficient. Alternatively or in combination therewith, releasable fastening means, for example suction cups or the like, can be attached to the table 27 in order to secure the storage items 4 for transport.

It is apparent from FIGS. 5 and 6 how a toothed rack 211 is immovably attached to the base 21. In other words, the toothed rack 211 is not movable with respect to the base 21. Likewise, a toothed rack 271 is attached to the table 27, said toothed rack 271 preferably being of identical construction to the toothed rack 211 of the base 21. The two toothed racks 211 and 271 are oriented toward one another. In other words, the toothings of the two toothed racks are directed toward one another. The toothed rack 211 of the base 21 extends in the first horizontal direction Z preferably along the entire length L of the base 21, and is arranged flush with the latter. In this case, the length L of the base 21 in the first horizontal direction Z is identical to the length L of the first carriage 22 in the first horizontal direction Z, which is identical to the length L of the table 27 in the first horizontal direction Z. Consequently, the toothed rack 211 of the base and the toothed rack 271, of identical construction, of the table 27 are equal to the length L of the base 21, wherein the toothed rack 271 of the table 27 also ends flush with the table 27 in the first horizontal direction Z.

In other words, the extension of the toothed rack 211 of the base 21 in the first horizontal direction Z is identical to the extension of the base 21 in this horizontal direction Z. Given that the toothed rack 211 attached to the base 21 is more or less flush with the base 21 at its free ends in the first horizontal direction Z, it is possible in this way for damage to this toothed rack 211 on account of any overhang to be ruled out. On account of the comparatively long length L of the toothed rack 211 attached to the base 21, the first carriage 21 can be moved in a driven manner along a comparatively long section by means of the toothed belt 232, wherein a comparatively large number of teeth of the toothed belt 232 are always engaged with teeth of the toothed rack 211 attached to the base 21. Therefore, comparatively high force transmission is allowed without any damage to the toothed belt 232 or the toothed rack 211 occurring. It is thus possible for even comparatively heavy storage items 4 such as components to be moved by means of the telescopic drive 2.

Expediently, the length L of the base 21 in the first horizontal direction Z is equal to the length L of the first carriage 22 in this horizontal direction Z. Consequently, in the retracted state of the telescopic drive 2, the first carriage 22 is more or less flush with the base 21 in the first horizontal direction Z, thereby simplifying movement of the telescopic drive 2. It is also possible for the toothed belt 231 of the toothed-belt drive 23 to be tensioned along a comparatively long section in the first horizontal direction Z, this advantageously increasing force transmission between the first carriage 22 and the base 21. Furthermore, a comparatively compact telescopic drive is provided in this way.

In the retracted state of the telescopic drive 2, the base 21 and the first carriage 22 and also the table 27 are thus flush with one another as seen in the first horizontal direction Z, as shown in FIG. 5.

Via a toothed-belt wheel 232, which is operatively connected to an electric motor 234 via a shaft 235, the toothed belt 231, which is at least externally toothed or preferably configured in a double-toothed manner, (not depicted here) can be driven.

In other words, when the toothed belt 231 is driven, it is moved, wherein, on account of the engagement with the toothed rack 211 of the base 21, the toothed belt 231 and consequently also the first carriage 22 are moved in the first horizontal direction Z. In this case, the toothed belt 231 rolls on the toothed rack 211 of the base 21. Suitably, the toothed belt 231 is electromotively driven and part of a toothed-belt drive 23, for which purpose for example an electric servomotor is used, this allowing comparatively precise positioning of the toothed belt 231 with respect to the toothed rack 211 attached to the base 21 and consequently of the first carriage 22 with respect to the base 21. Thus, a comparatively robust and low-maintenance telescopic drive 1 is advantageously provided, since, on account of the separation of the linear guide 28 from the toothed-belt drive 23, which comprises the toothed belt 231 and the toothed rack 211, it is also possible for comparatively large loads or storage items 4 to be moved.

In addition, the toothed belt 231 and toothed rack 211 are of low construction, with the result that production costs are also reduced.

The toothed belt 231, configured in a circulating manner, is engaged in the vertical direction Y not only with the toothed rack 211 of the base but also with a toothed rack 271 of the table 27 by way of its external toothing. Thus, by means of the toothed belt 231, an encircling curve is established which is substantially O-shaped and is illustrated by a dot-dashed line in FIG. 5. As illustrated, the toothed belt 231 is tensioned in the first horizontal direction Z, preferably via its internal toothing, by means of at least two toothed-belt wheels 232 which are spaced apart from one another in the first horizontal direction Z, wherein the spacing can correspond more or less to for example ¾ of the length L of the base 21.

Preferably, the axis of rotation 233 of the toothed-belt wheels 232 is oriented perpendicular to the direction of movement of the toothed belt 231, i.e. in a manner extending parallel to the second horizontal direction X. In other words, the axis of rotation 233 extends in a second horizontal direction X, which is perpendicular to the vertical direction Y and to the first horizontal direction Z, in which the toothed belt 231 is tensioned, such that one of the toothed-belt wheels 232 can be attached to a shaft 235, preferably likewise extending in the second horizontal direction X, of an electric motor 234, which, according to the invention, is a constituent part of the first carriage 22. In this way, the mechanism of the telescopic drive 2 is simplified and consequently susceptibility to faults is reduced.

The electric motor 234 can be in particular a servomotor with speed control and position control. The electric motor 234 and the controller are energized for example via lines which are arranged between the first carriage 22 and the base 21 in a cable carrier 236.

Given that the toothed belt 231 driven in this way is positioned on the toothed rack 211 of the base 21, that flank of the toothed belt 231, tensioned in an O-shaped manner, that is located at the bottom in the vertical direction Y and extends in the first horizontal direction Z, is engaged with the teeth of the toothed rack 211 of the base 21. At the same time, the further flank of the toothed belt 231, said further flank being parallel to and extending above said flank in the vertical direction Y, and extending in the first horizontal direction Z, is engaged with the toothed rack 271 of the table 71, which is consequently likewise meshed with the toothed belt 231. The teeth of the toothed belt 231 and of the two toothed racks 211 and 271 in this case extend perpendicularly to the first horizontal direction Z in the direction of the second horizontal direction X.

As is finally also readily apparent from FIGS. 5 and 6, the overall height of the telescopic drive 2 in this configuration advantageously amounts merely to the height of the base 21 and of the toothed rack 211 arranged thereon plus the height of a first 22 carriage, comprising a toothed-belt drive 23, and also the height of a table 27, arranged thereabove, including a toothed rack 271 arranged on the table 27 (cf. also FIG. 7, immediately below).

Figure 7A:
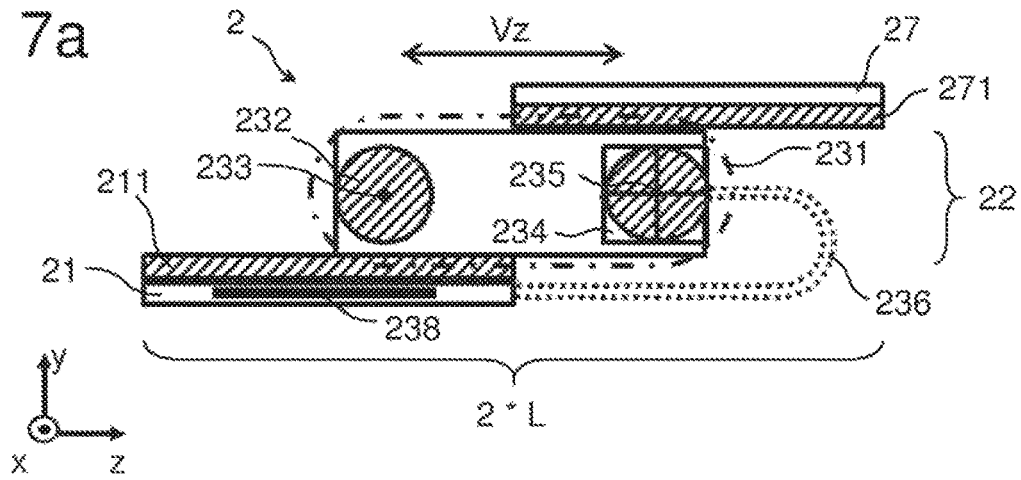
FIG. 7a shows a side view of the telescopic drive from FIG. 5 in a state extended by means of its toothed-belt drive.
Figure 7B:
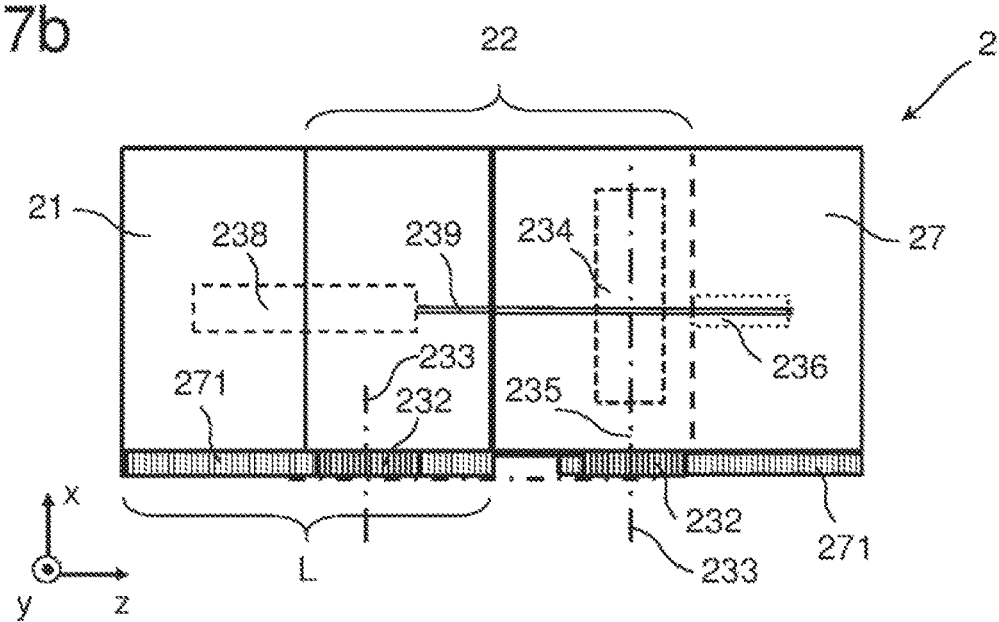

FIG. 7a shows a side view and FIG. 7b a plan view, in an enlarged manner, of the telescopic drive 2 from FIG. 5 in a state extended by means of its toothed-belt drive 23. As can be seen, a travel movement $V_z$ in the first horizontal direction Z has advantageously been allowed at least along half the lengths of the respective toothed racks 21 and 271 of the base 21 and table 27, such that an overall stroke of at least 2*L results.

Specifically, as soon as the electric motor 234 is operated, and consequently the shaft 235 rotates a toothed-belt wheel 232 about the axis of rotation 233 thereof, the toothed belt 231 is moved and consequently rolled along the toothed rack 211 of the base 21. Consequently, the first carriage 22 is moved so as to execute a travel movement $V_z$ in the first horizontal direction Z. Since the toothed rack 271 of the table 71 is likewise engaged with the remaining flank, extending in the first horizontal direction Z, of the toothed belt 231, it is moved in the same direction. In this case, it is preferably possible to move the toothed belt 231 in both directions, i.e. both in a positive (+Z) and in a negative (−Z) first horizontal direction, such that the first carriage 21 is movable in the first horizontal direction Z on both sides of the base 21 and the table 27 arranged thereon is movable on both sides of the first carriage 21, as shown below in FIGS. 8 and 9.

For this purpose, the toothed belt 231, and in particular the toothed rack 211 attached to the base 21, is configured in a suitable manner. In particular, the toothed belt 231 is particularly preferably not fastened to the toothed rack 211 of the base, but merely engaged therewith, for which reason it rolls along the toothed rack 211 of the base 21 in the manner of a caterpillar track when it is driven. Preferably, the toothed belt 231 is drivable in both directions, i.e. both in a positive (+Z) and in a negative (−Z) first horizontal direction Z.

Suitably, the telescopic drive 2 has a stop (not illustrated), by means of which the movement of the first carriage 22 with respect to the base 21 is limited. Preferably, the linear guide 28 has the stop, by means of which a travel movement V of the first carriage 22 with respect to the base 21 is limited. By way of example, the stop is used to prevent the first carriage 22 from protruding by more than 80%, 75%, 70%, 60%, 55%, 50%, 45% or 40% of the length L of the first carriage 22 in the first horizontal direction Z with respect to the base 21. In particular, the telescopic drive 2 has two such stops, wherein for example the maximum possible overhang of the first carriage 22 in the first horizontal direction Z with respect to the base 21 is the same on both sides. This prevents any detachment of the first carriage 22 from the base 21 on account of an excessive movement V. It is also possible in this way to prevent tilting or comparatively high loading of the linear guide 28.

Particularly preferably, the table 27 is also movable by means of the toothed belt 231, and in particular by means of the toothed rack 271 arranged on the table 27, on both sides of the first carriage 22 in the first horizontal direction Z. In other words, the table 27 is suitable, in particular intended and set up, for being moved on both sides of the first carriage 22 by means of the toothed belt 271. When the telescopic drive 2 is operated, provided that the first carriage 22 is movable on both sides of the base 21, in particular the first carriage 22 is moved with respect to the base 21 and the table 27 is moved with respect to the first carriage 22 in each case same side as seen in the first horizontal direction Z, thereby advantageously increasing the extension or the stroke of the telescopic drive 2 in the first horizontal direction Z. On account of the first carriage 22 and table 27 being movable on both sides, it is possible to move components, in particular pick up and set down storage items 4, on both sides of the base 21, wherein a maximum movement length is increased.

Particularly preferably, a stop can be provided, by means of which a movement of the table 27 with respect to the first carriage 22 is also limited. In this case, the stop is set in particular such that the table 27 can be moved preferably by the same amount with respect to the first carriage 22 as the first carriage 22 can be moved with respect to the base 21. Expediently, at least one of the linear guides 28 arranged between the table 27 and first carriage 22 has a stop, by means of which a movement of the table 27 with respect to the first carriage 22 is limited, such that any detachment of the table 27 from the first carriage 22 on account of excessive driving of the toothed belt 231 of the toothed-belt drive 23 is prevented.

Figure 8A:
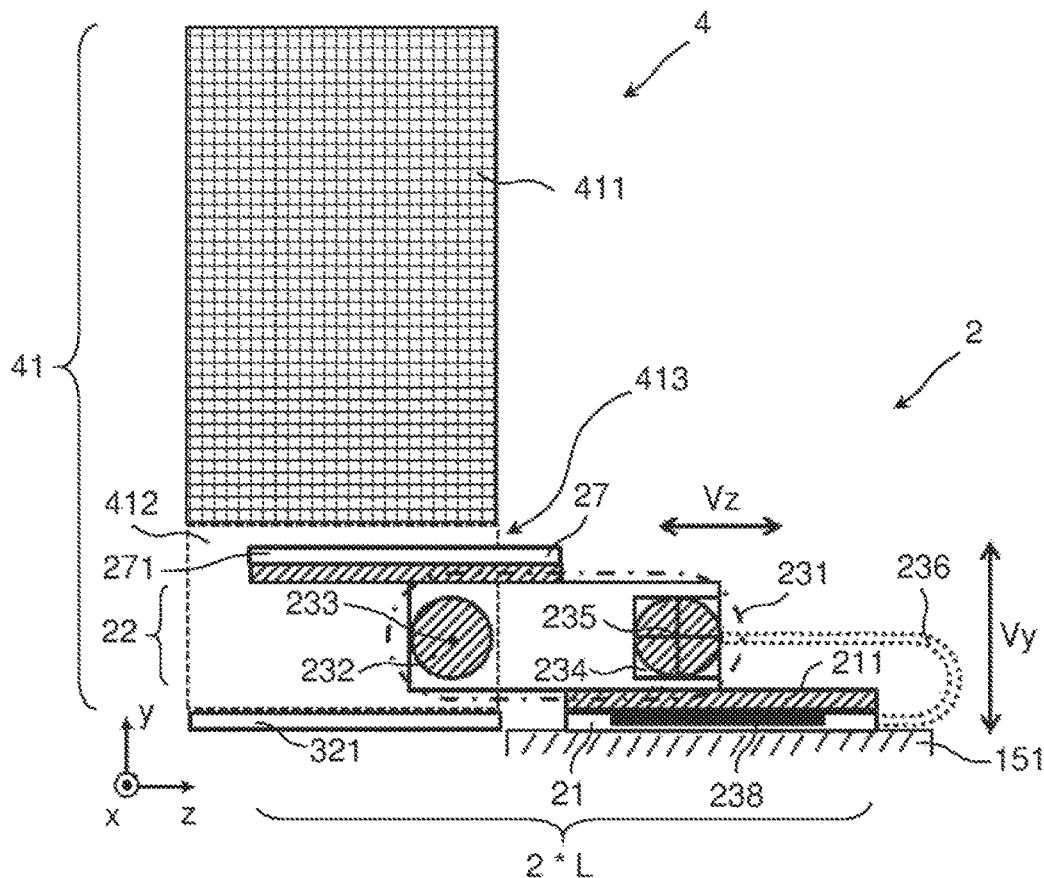
FIG. 8a shows a side view of the extended telescopic drive from FIG. 5 at the moment at which a typical storage item has just been set down.
Figure 8B:
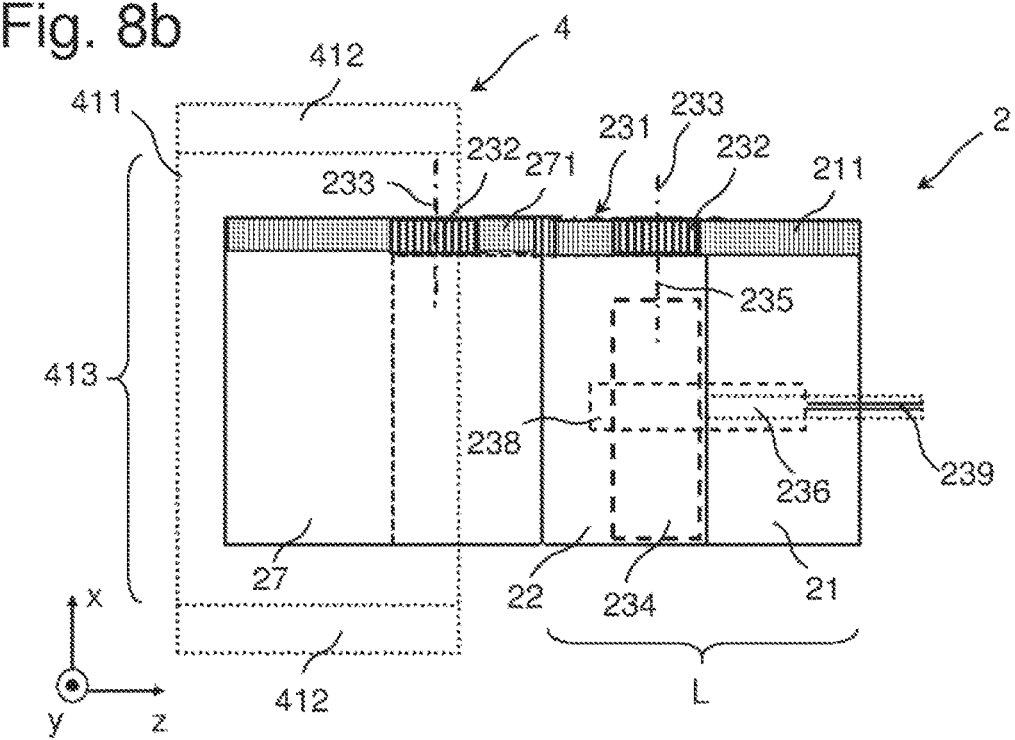
Figure 9A:
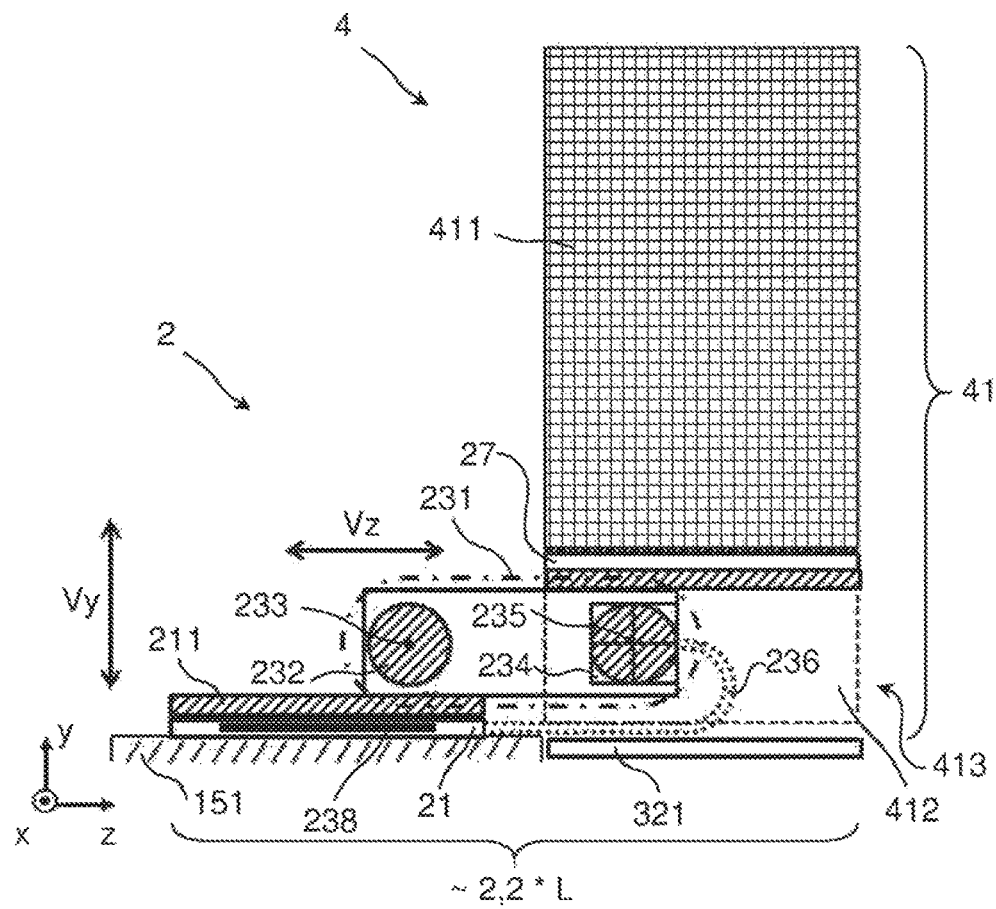
FIG. 9a shows a side view of the extended telescopic drive from FIG. 5 at the moment at which a typical storage item is lifted.
Figure 9B:
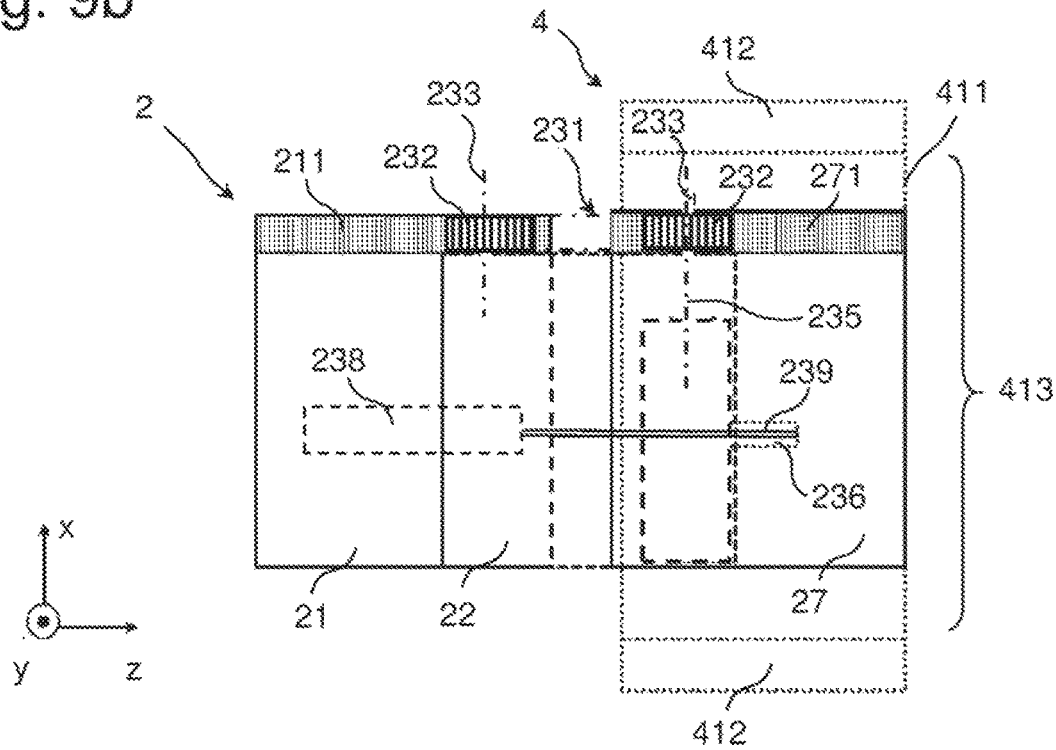

FIG. 8a shows a side view and FIG. 8b a plan view of the extended telescopic drive 2 from FIG. 5 at the moment at which a typical storage item 4 has just been set down; and FIG. 9a and FIG. 9b show the moment at which a typical storage item 4 is lifted. It is apparent how the respective overall stroke of the telescopic drive 2 has to be more than 2*L, if the underside of the storage item 4 is intended to be gripped across its entire width. In this case, FIGS. 8a and 8b show for example a travel movement $V_z$ already retracted to 2*L and FIGS. 9a and 9b show the travel movement $V_z$, now 2.2*L, in the first horizontal direction Z.

This consequently allows two mutually adjacent storage racks 31 that adjoin the same storage aisle 33 to be equipped by means of the same storage and retrieval unit 1, wherein the table 27 bearing the storage item 4 can be extended into the recess 413 between the skids 412 or into a comparable clearance under the storage item 4. On account of the first carriage 21 and of the table 27 arranged thereon, the maximum movement length in the first horizontal direction Z is increased. Because of the positioning of the toothed belt 231 between the two toothed racks 211 and 271, the first carriage 22 is moved in the first horizontal direction Z with respect to the base 21 on the same side as the table 27 is moved with respect to the first carriage 22, wherein the two travel movements $V_z$ take place substantially at the same time.

A typical storage item 4 can advantageously be set down or lifted by way of a travel movement $V_y$ of the cab 15 (represented only by the cab bottom 151 in FIGS. 8 and 9) in the vertical direction Y.

A storage and retrieval unit 1 having at least one cab 15 that is electromotively driven at least in a second horizontal direction X and a vertical direction Y and is guided in a three-dimensional compartment matrix 13 of the storage and retrieval unit 1, said cab 15 having a telescopic drive 2, as described above, for receiving a storage item 4, is operated for example in accordance with a method described below:

In a first work step, a cab 15 is positioned in a rack compartment 11 corresponding to a storage compartment 32.

In a following second work step, the electric motor 234 of a toothed-belt drive 23 is actuated such that the toothed belt 231 is moved. Consequently, the first carriage 22 and the table 27 are moved into the storage compartment 32 for example between the two skids 412 of a container 41 to be received or comparable storage item 4 and thus into the recess 413 left by the container skids 412 or a comparable recess 413. In the process, the table 27 and the first carriage 22 are spaced apart both from the storage-compartment bottom 321 and from the storage item 4. The resulting state is illustrated in FIG. 8a in a side view, which is parallel to the vertical direction Y and to the first horizontal direction Z, and in FIG. 8b in a plan view.

In a following third work step, the entire cab 15 is moved in the vertical direction Y, for which reason the table 27 is moved from below against the container body 411 of the storage item 4. Consequently, the skids 412 are spaced apart from the storage-compartment bottom 321, as shown in FIG. 9a in a side view. Consequently, the container 41 is lifted and is positioned on the table 27.

In a following fourth work step, the telescopic drive 2 is retracted, for which purpose the electric motor 234 is energized in a suitable manner. Consequently, the state, illustrated in FIG. 5, of the telescopic drive 2 is established, wherein the storage item 4 has been moved out of the storage compartment 32 into the cab 15.

In a following fifth work step, the cab 15 is positioned in a further rack compartment 12 or in a loading compartment 14.

In a following sixth work step, the telescopic drive 2 is operated again and extended, i.e. a travel movement $V_z$ of the first carriage 22 and of the table 27 in the first horizontal direction Z is carried out. Thus, the storage item 4 is positioned in a further one of the storage compartments 32 or above one of the conveyor belts 34, wherein the skids 412 of the storage item 4 are spaced apart from the respective storage-compartment bottom 321 or from the conveyor belt 34. The storage compartment 32 can be for example a constituent part of a further storage rack 31, which adjoins the same storage aisle 33.

In order to set down the container, a seventh work step is carried out, in which the entire cab 15 is moved in the vertical direction Y, in particular downward. Consequently, the storage item 4 is set down on its skids 412 or so as to be supported in a comparable manner.

In the following eighth work step, the table 27, which is now free of the storage item 4, is moved back into a position above the base 21 in the vertical direction Y by means of suitable energizing of the electric motor 234, and thus the state, illustrated in FIG. 5, of the telescopic drive 2 is established.

The electric motor 234 of the telescopic drive 2 can be supplied with electricity via a power line 239, preferably guided in a cable carrier 236 (see in particular FIGS. 5, 7a, 8a, 9a), said power line 239 connecting the electric motor 234 to at least one rechargeable power storage device 238 arranged in the cab 15, said power storage device 238 being charged in separate charging stations (not illustrated) and/or preferably, with the cab 15 at a standstill, from the power supply of the storage and retrieval unit 1 via at least one plug connection, and/or, during the travel movements of the cab 15, by means of at least one dynamo (not illustrated) set into rotation, preferably by means of at least one hub dynamo (not illustrated) arranged in one of the rollers of the cab 15.

In summary, it is possible, by means of the telescopic drive 2, to grip an article, in particular storage item 4, which is located outside the base 21 in the first horizontal direction Z. In this case, it is also possible, by means of the telescopic drive 2, to transport an article, in particular storage item 4, located on one side of the base 21 to the other side in the first horizontal direction Z without any setting down or transposition. The first carriage 22 and the table 27 are movable by means of a linear guide 28 which preferably executes the permissible travel movement $V_z$ only as far as a limit at which guidance and support are still ensured. During operation, on account of the electric motor 234 of the toothed-belt drive 23 being driven, the toothed belt 231 of the latter and thus the first carriage 22 are shifted with respect to the base 21. At the same time, the table 27 is shifted by the same amount with respect to the first carriage 22. Consequently, the table 27 can advantageously be shifted by twice the amount in the first horizontal direction Z with respect to the base 21.

In a further embodiment of the invention that is not illustrated, each of the storage compartments 32 can comprise such a telescopic drive 2, which is located either on the bottom, a side wall or the ceiling of the respective storage compartment 32. By means of the telescopic drive 2, the storage item 4 located in the respective storage compartment 22 is conveyed into the associated rack compartment 12 or from the latter into the respective storage compartment 32, provided that one of the cabs 15 is arranged in the rack compartment 12.

The invention is not limited to the above-described exemplary embodiments. Rather, other variants of the invention can also be derived therefrom by a person skilled in the art without departing from the scope of the invention. In particular, all individual features described in conjunction with the exemplary embodiment are also combinable with one another in some other way without departing from the scope of the invention.

Figure 10A:
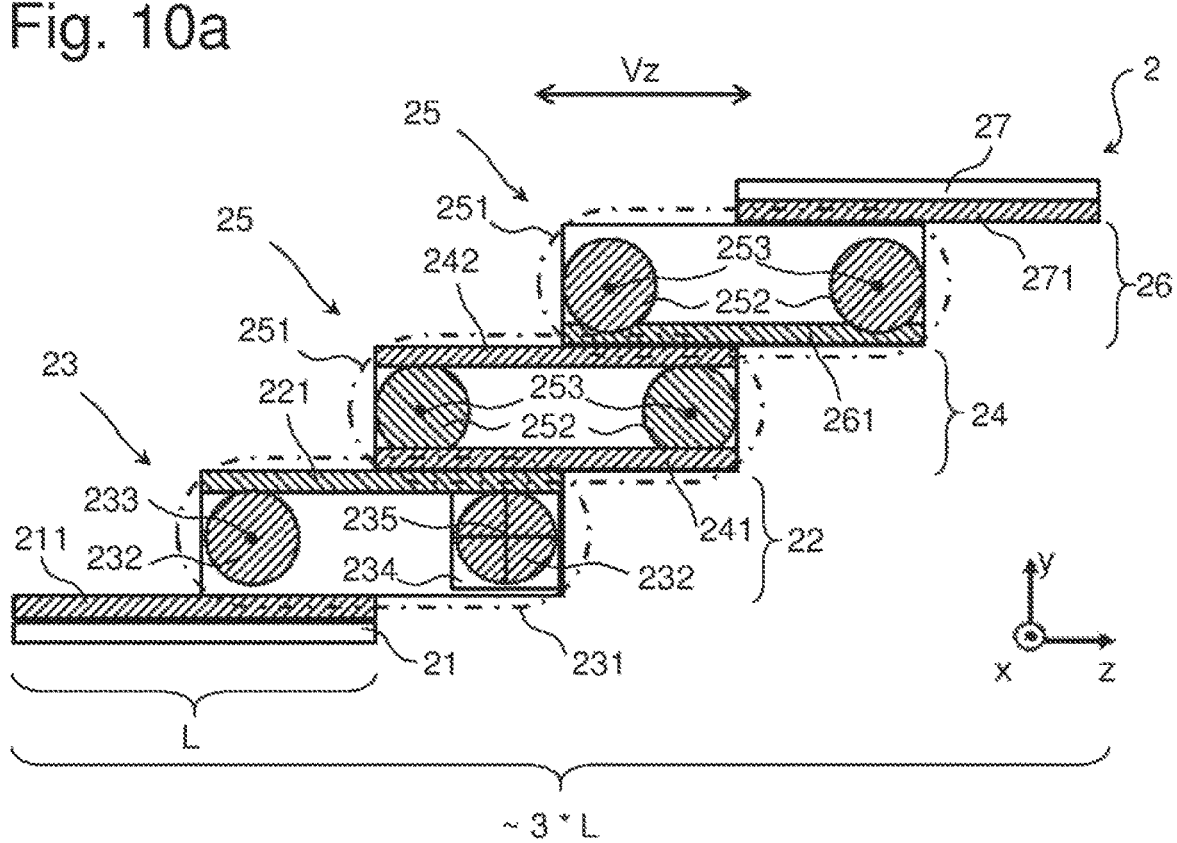
FIG. 10a shows a side view of a second exemplary embodiment of a telescopic drive, of cascaded construction, of one of the cabs.

Thus, FIG. 10a shows a side view of a second exemplary embodiment of a telescopic drive 2, of cascaded construction, of one of the cabs 15. By way of example, the illustrated configuration of the telescopic drive 2 of cascaded construction comprises three carriages 22, 24 and 26 and a table 27 arranged on the third carriage 26. As can be seen, the telescopic drive 2 of cascaded construction makes do with only one toothed-belt drive 23, arranged on the first carriage, since both the second 24 and the third carriage 26, arranged thereabove, can be moved via separate toothed-belt drives 25. To this end, the first carriage 22 has, on its opposite side from the toothed-belt drive 23, an immovably attached toothed rack 221 extending in the first horizontal direction Z, wherein the second carriage 24 comprises a toothed-belt drive 25 with a toothed belt 251 which is tensioned in the first horizontal direction Z and is positioned on the toothed rack 221 of the first carriage 22. Furthermore, the second carriage 24 comprises, on its opposite side from the toothed-belt drive 25, an immovably attached toothed rack 242 extending in the first horizontal direction Z, wherein the third carriage 26 comprises a toothed-belt drive 25 with a toothed belt 251 which is tensioned in the first horizontal direction Z and is positioned on the toothed rack 242 of the second carriage 24, and wherein a toothed rack 261 extending in the first horizontal direction Z is immovably attached to the third carriage 26, said toothed rack 261 being positioned on the toothed belt 251 of the toothed-belt drive 25 of the second carriage 24. If, finally, a table 27 is arranged on the second 24 or—as illustrated—on the third 26 carriage, a toothed rack 271 extending in the first horizontal direction Z is immovably attached to said table 27, said toothed rack 271 being positioned on the toothed belt 251 of the toothed-belt drive 25 of the second 24 or third 26 carriage.

Such cascading with three carriages 22, 24, 26 and a table 27 can, for example, advantageously allow the table 27 to be moved with respect to the base 21 by up to 3*L and thus allow the storage item 4 to be shifted into a parallel storage rack 31, as illustrated in FIG. 1b.

This allows cascading of the telescopic drive 2 advantageously while retaining small overall heights, in which, for each additional cascade, the respective toothed-belt drive 25 moves a toothed rack 261, 271 of the next carriage 26 or table 27 and the toothed-belt drive 25 of the respective carriage 24, 26 is moved by a toothed rack 221, 242 of the preceding carriage 22, 24. Advantageously, in this case, only one toothed-belt drive 23 has to be provided overall.

The toothed belt(s) 231 and 251 are advantageously each tensioned by means of two rotatably mounted toothed-belt wheels 232 and 252, wherein it has proven successful for the axes of rotation 233 and 253 of the toothed-belt wheels 232 and 252 to extend in a second horizontal direction X, in particular perpendicular to the first horizontal direction Z.

The toothed racks 211, 241; 221, 261; 242, 271 can extend preferably along the entire length L of the base 21 in the first horizontal direction Z, the length L of which corresponds to the length of the carriages 22, 24, 26 and optionally of a table 27 in the first horizontal direction Z. In this case, it has proven successful for the length L of the base 21 to be configured to be equal to the length of the carriages 22, 24, 26 and optionally of the table 27 in the first horizontal direction Z.

The direct or indirect support of the individual carriages 22, 24, 26 and optionally of a table 27 takes place preferably in an analogous manner to the description of FIG. 6: if, in this case—as illustrated—at least one second carriage 24 is arranged between the first carriage 22 and a table 27, said second carriage 24 is supported on the first carriage 22 so as to be movable in the first horizontal direction Z by means of a linear guide 28. If—as illustrated—a third carriage 26 is arranged between the second carriage 24 and the table 27, said third carriage 26 is supported on the second carriage 24 so as to be movable in the first horizontal direction Z by means of a linear guide 28. If a table 27 is arranged on the second 24 or—as illustrated—on the third 26 carriage, said table 27 is supported on the second 24 or third 26 carriage so as to be movable in the first horizontal direction Z by means of a linear guide 28.

Figure 11:
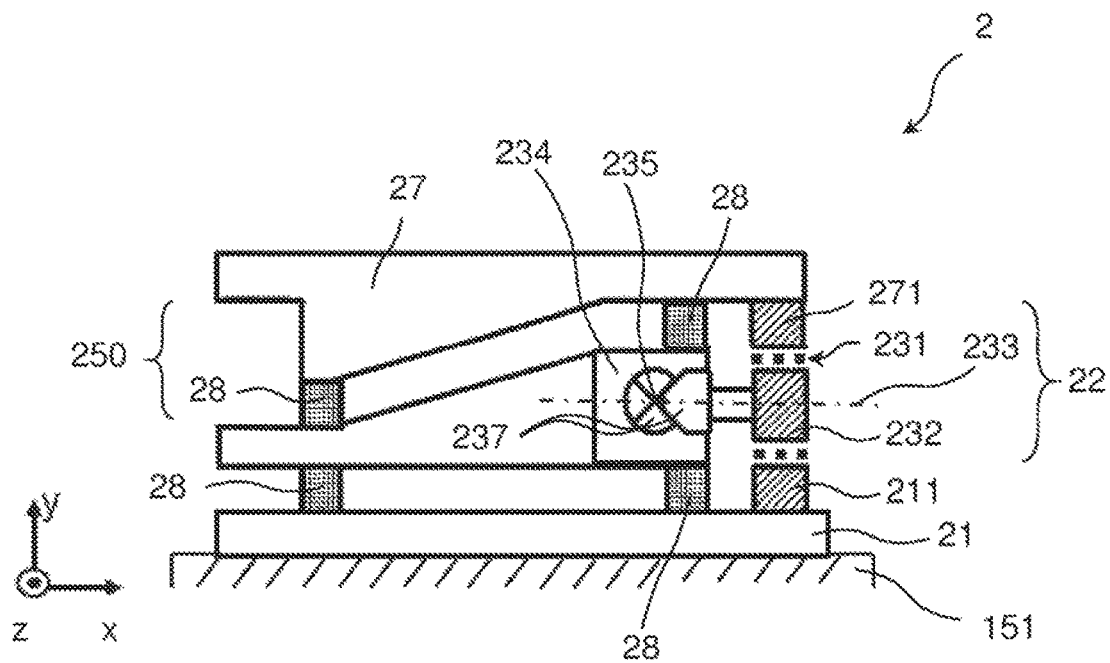
FIG. 11 shows a side view of a third exemplary embodiment of a telescopic drive of one of the cabs.

FIG. 11 shows a side view of a third exemplary embodiment—analogous to the first exemplary embodiment (see FIGS. 5 to 9)—of a telescopic drive 2 of one of the cabs 15.

Figure 10B:
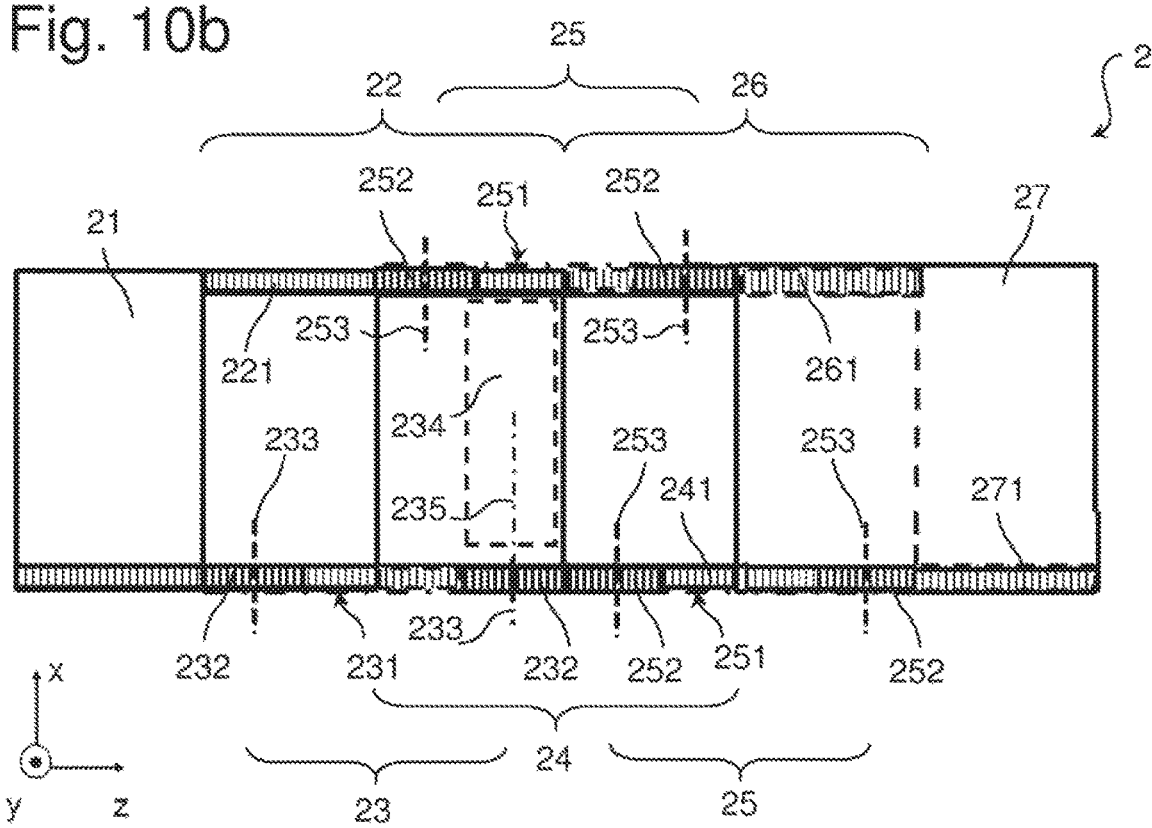
Figure 12:
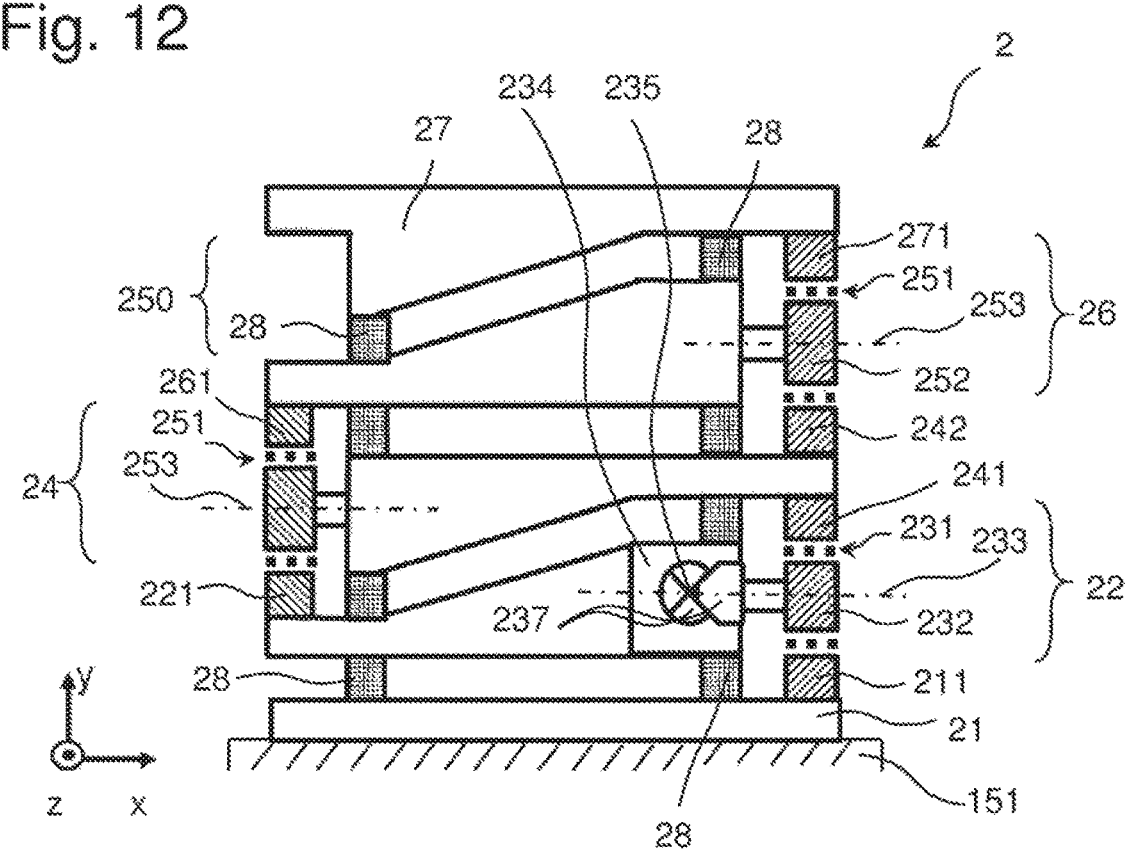
FIG. 12 shows a side view of a fourth exemplary embodiment of a telescopic drive, of cascaded construction, of one of the cabs.

In a corresponding manner, FIG. 12 shows a side view of a fourth exemplary embodiment—analogous to the second exemplary embodiment (see FIG. 10)—of a telescopic drive 2, configured in a cascaded manner, of one of the cabs 15.

In contrast to the first and second exemplary embodiments, in which the shaft 235 of the electric motor 234 is arranged in a manner aligned with the axis of rotation 233 of an electromotively driven toothed-belt wheel 232, in the third and fourth exemplary embodiments, the shaft 235 of the electric motor 234 is arranged at an angle of in particular 90° to the axis of rotation 233 of an electromotively driven toothed-belt wheel 232, with angle-compensating deflection means such as in particular bevel gears 237 being interposed.

The arrangement of the electric motor 234 at an angle of in particular 90° to the axis of rotation 233 of the toothed-belt wheel 232, to be driven, of the toothed-belt drive 23 makes it possible to configure at least the motor-bearing carriage 22 in a narrowed manner, on the opposite side from the electric motor 234, with respect to its vertical extent, and finally advantageously creates valuable installation space 250, in particular on the side remote from the motor, for the toothed-belt drives 25 that are required in the preferably cascaded structure of a telescopic drive 40. In an analogous manner, it is possible, alternatively or additionally, for all of the possibly present further carriages 24, 26 to be configured likewise in a narrowed manner, on their opposite side from the respective toothed-belt drive 25, in their vertical extent, in order to advantageously further increase the compact construction of the telescopic drive 2 in this way.

In summary, the present invention provides a telescopic drive 2, a storage and retrieval unit 1 comprising the latter, and an operating method and use therefor, having a base 21, which 21 comprises a firmly attached toothed rack 211 extending in a first horizontal direction Z; and having at least one first carriage 22 arranged on the base 21, which 22 is supported on the base 21 so as to be movable in the first horizontal direction Z by means of a linear guide 28; and which 22 comprises a toothed-belt drive 23 made up of at least an electric motor 234 and a circulating toothed belt 231 that is driven thereby 234, is tensioned in the first horizontal direction Z and is positioned on the toothed rack 211 of the base 21.

The integration of the telescopic drive 2 into a cab 15 that is electromotively movable within a three-dimensional compartment matrix 13 of an equipment rack 11 allows not only a compact structure but also movements of a storage item 4, which go up to or preferably also beyond the extent of an individual storage compartment 32, and thus allows the storage item 4 to be transferred to a different storage and retrieval unit 1 in an adjacent parallel storage aisle 31.

In the preferably comprehensive configuration, it is thus possible for storage items 4 to be transferred advantageously across a series of storage compartments 32 and for the speed of distribution of storage items 4, i.e. the turnover thereof in a high-bay warehouse 3, advantageously to be increased.

As a result of the number of cabs 15 moved at the same time in a storage and retrieval unit 1 being increased, the turnover of storage items 4 per unit time and/or the storage capacity of the high-bay warehouse 3 with the same space requirement can ultimately be at least temporarily increased, if necessary.

LIST OF REFERENCE SIGNS

1 Storage and retrieval unit
   11 Equipment rack
   12 Rack compartment
   13 Three-dimensional compartment matrix of rack compartments 12
   14 Loading compartment
   15 Cab
      151 Cab bottom
2 Telescopic drive
   21 Base
      211 Toothed rack of the base 21
   22 First carriage
      221 Toothed rack of the first carriage 22
   23 Toothed-belt drive
      231 Toothed belt
      232 Toothed-belt wheels
      233 Axis of rotation of the toothed-belt wheels 232
      234 Electric motor
      235 Shaft
      236 Cable carrier
      237 Bevel gear
      238 Power storage device
      239 Power line
   24 Second carriage
      241 First toothed rack of the second carriage 24
      242 Second toothed rack of the second carriage 24
   25 Toothed-belt drive
      250 Installation space
      251 Toothed belt
      252 Toothed-belt wheels
      253 Axis of rotation of the toothed-belt wheels 252
   26 Third carriage
      261 Toothed rack of the third carriage 26
   27 Table
      271 Toothed rack of the table 27
   28 Linear guide
3 High-bay warehouse
   31 Storage rack of the high-bay warehouse 3
      311 First side
      312 Second side
      313 End side
   32 Storage compartment
      321 Storage-compartment bottom
      322 Strut
   33 Storage aisle
   34 Conveyor belt
   35 Robot
   36 Three-dimensional compartment matrix of storage compartments 32
4 Storage item
   41 Container
      411 Container body
      412 Container skid
      413 Recess
Z First horizontal direction
X Second horizontal direction
Y Vertical direction
L Length of the base 21
$V_z$ Travel movement in first horizontal direction Z
$V_x$ Travel movement in second horizontal direction X
$V_y$ Travel movement in vertical direction Y

The invention claimed is:

1. A telescopic drive, comprising:
a base;
a base toothed rack attached to said base and extending in a first horizontal direction of said base;
a linear guide; and
at least one first carriage disposed on said base, said first carriage supported on said base so as to be movable in the first horizontal direction by means of said linear guide, said first carriage having a toothed-belt drive made up of at least an electric motor and a circulating and at least externally toothed first toothed belt being driven by means of said electric motor, said electric motor being carried on said first carriage and movable together with said first carriage, said first toothed belt being tensioned in the first horizontal direction and is positioned on said base toothed rack of said base.

2. The telescopic drive according to claim 1, further comprising:
a table supported by said first carriage so as to be movable in the first horizontal direction by means of said linear guide; and
a table toothed rack, extending in the first horizontal direction, and attached to said table, said table toothed rack positioned on said first toothed belt of said toothed-belt drive.

3. The telescopic drive according to claim 2,
further comprising at least one second carriage disposed between said first carriage and said table, said at least one second carriage is supported on said first carriage so as to be movable in the first horizontal direction by means of said linear guide;
wherein said first carriage has, on a side opposite from said toothed-belt drive, an attached first toothed rack extending in the first horizontal direction; and
wherein said second carriage has a second toothed-belt drive made up of at least one circulating and at least externally toothed second toothed belt which is tensioned in the first horizontal direction and is positioned on said first toothed rack of said first carriage.

4. The telescopic drive according to claim 3,
further comprising a third carriage disposed between said second carriage and said table, said third carriage is supported on said second carriage so as to be movable in the first horizontal direction by means of said linear guide;
wherein said second carriage has, on a side opposite from said second toothed-belt drive, an attached second toothed rack extending in the first horizontal direction;
wherein said third carriage has a third toothed-belt drive (25 second time) made up of at least one circulating and at least externally toothed third toothed belt which is tensioned in the first horizontal direction and is positioned on said second toothed rack of said second carriage; and
further comprising a third toothed rack extending in the first horizontal direction and attached to said third carriage, said third toothed rack being positioned on said second toothed belt of said second toothed-belt drive of said second carriage.

5. The telescopic drive according to claim 4, wherein:
on said third carriage, said table is disposed, said table is supported on said third carriage so as to be movable in the first horizontal direction by means of said linear guide;
said table toothed rack, extending in the first horizontal direction, of said table and is attached to said table, said table toothed rack being positioned on said third toothed belt of said third toothed-belt drive of said third carriage.

6. The telescopic drive according to claim 4, wherein said first, second and third toothed belts are formed in a double-toothed manner.

7. The telescopic drive according to claim 6, further comprising rotatably mounted toothed-belt wheels, said first, second and third toothed belts are each tensioned by means of two of said rotatably mounted toothed-belt wheels, and axes of rotation of said rotatably mounted toothed-belt wheels extend in a second horizontal direction, perpendicular to the first horizontal direction.

8. The telescopic drive according to claim 7,
further comprising angle-compensating deflection means; and
wherein said electric motor has a shaft disposed in an aligned manner or at an angle to an axis of rotation of one of said rotatably mounted toothed-belt wheels, with said angle-compensating deflection means being interposed.

9. The telescopic drive according to claim 1, wherein:
said electric motor has a shaft; and
the telescopic drive is one of two telescopic drives disposed parallel to one another to form a tandem, at least said toothed-belt drive of at least one of said telescopic drives is attached to said shaft of said electric motor.

10. The telescopic drive according to claim 4, wherein said base toothed rack, said first toothed rack, said second toothed rack and said third toothed rack extend along an entire length of said base in the first horizontal direction, the length of said base corresponds to a length of said first, second and third carriage in the first horizontal direction.

11. The telescopic drive according to claim 8, wherein said first, second and third carriages are movable in the first horizontal direction by means of said first, second and third toothed belts on both sides of said base, namely both in a positive and in a negative first horizontal direction.

12. The telescopic drive according to claim 8, wherein said angle-compensating deflection means have bevel gears.

13. The telescopic drive according to claim 9, further comprising toothed-belt wheels, said toothed-belt drive of said at least one of said telescopic drives is attached to said shaft of said electric motor via one of said toothed-belt wheels.

14. The telescopic drive according to claim 4, wherein:
on said second carriage, said table is disposed, said table is supported on said second carriage so as to be movable in the first horizontal direction by means of said linear guide;
said table toothed rack, extending in the first horizontal direction, of said table and is attached to said table, said table toothed rack being positioned on said second toothed belt of said second toothed-belt drive of said second carriage.

15. A storage and retrieval unit, comprising:
a three-dimensional compartment matrix;
at least one cab being electromotively driven at least in a second horizontal direction and a vertical direction and is guided in said three-dimensional compartment matrix, said cab having a telescopic drive for picking up a storage item, said telescopic drive containing:
a base;
a base toothed rack attached to said base and extending in a first horizontal direction of said base;
a linear guide; and
at least one first carriage disposed on said base, said first carriage supported on said base so as to be movable in the first horizontal direction by means of said linear guide, said first carriage having a toothed-belt drive made up of at least an electric motor and a circulating and at least externally toothed first toothed belt being driven by means of said electric motor, said electric motor being carried on said first carriage and movable together with said first carriage, and said first toothed belt being tensioned in the first horizontal direction and positioned on said based toothed rack of said base.

16. The storage and retrieval unit according to claim 15, further comprising at least one rechargeable power storage device disposed in said cab;
wherein a supply of said electric motor of said toothed-belt drive of said telescopic drive with electricity is ensured by means of said at least one rechargeable power storage device; and
said rechargeable power storage device being charged in separate charging stations and/or with said cab at a standstill, from a power supply for the storage and retrieval unit via at least one plug connection, and/or, during travel movements of said cab, by means of at least one dynamo set into rotation, by means of at least one hub dynamo disposed in one of rollers of said cab.

17. A method for operating a storage and retrieval unit, which comprises the steps of:
providing a storage and retrieval unit, containing:
a three-dimensional compartment matrix;
at least one cab being electromotively driven at least in a second horizontal direction and a vertical direction and is guided in the three-dimensional compartment matrix, the cab having a telescopic drive for picking up a storage item, the telescopic drive containing:
a base;
a base toothed rack attached to the base and extending in a first horizontal direction of the base;
a linear guide; and
at least one first carriage disposed on the base, the first carriage supported on the base so as to be movable in the first horizontal direction by means of the linear guide, the first carriage having a toothed-belt drive made up of at least an electric motor and a circulating and at least externally toothed first toothed belt being driven by means of the electric motor, the electric motor being carried on the first carriage and movable together with the first carriage, and the first toothed belt being tensioned in the first horizontal direction and positioned on the based toothed rack of the base; and
wherein a travel movement of the cab in the vertical direction causes the storage item to be picked up or set down by means of the telescopic drive that engages sufficiently beneath the storage item.

18. A method of using a storage and retrieval system, which comprises the steps of:
providing a storage and retrieval unit, containing:
a three-dimensional compartment matrix;
a plurality of cabs being electromotively driven at least in a second horizontal direction and a vertical direction and is guided in the three-dimensional compartment matrix, the cabs each having a telescopic drive for picking up a storage item, the telescopic drive containing:
a base;
a base toothed rack attached to the base and extending in a first horizontal direction of the base;
a linear guide; and at least one first carriage disposed on the base, the first carriage supported on the base so as to be movable in the first horizontal direction by means of the linear guide, the first carriage having a toothed-belt drive made up of at least an electric motor and a circulating and at least externally toothed first toothed belt being driven by means of the electric motor, the electric motor being carried on the first carriage and movable together with the first carriage, and the first toothed belt being tensioned in the first horizontal direction and positioned on the based toothed rack of the base; and using the plurality cabs for at least temporary storage of storage items in the storage and retrieval unit.

* * * * *